US012665731B2

(12) United States Patent
He et al.

(10) Patent No.: US 12,665,731 B2
(45) Date of Patent: Jun. 23, 2026

(54) SCELL MANAGEMENT IN WIRELESS COMMUNICATION

(71) Applicant: Apple Inc., Cupertino, CA (US)

(72) Inventors: Hong He, San Jose, CA (US); Dawei Zhang, Saratoga, CA (US); Wei Zeng, Saratoga, CA (US); Haitong Sun, Saratoga, CA (US); Chunhai Yao, Beijing (CN); Yang Tang, San Jose, CA (US); Jie Cui, San Jose, CA (US); Sigen Ye, San Diego, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 18/261,295

(22) PCT Filed: May 31, 2021

(86) PCT No.: PCT/CN2021/097287
§ 371 (c)(1),
(2) Date: Jul. 13, 2023

(87) PCT Pub. No.: WO2022/151634
PCT Pub. Date: Jul. 21, 2022

(65) Prior Publication Data
US 2024/0080169 A1 Mar. 7, 2024

(30) Foreign Application Priority Data
Jan. 15, 2021 (WO) ................ PCT/CN2021/072106

(51) Int. Cl.
*H04L 5/00* (2006.01)
(52) U.S. Cl.
CPC .......... *H04L 5/0098* (2013.01); *H04L 5/0055* (2013.01); *H04L 5/0057* (2013.01); *H04L 5/0094* (2013.01)

(58) Field of Classification Search
CPC ... H04L 5/0098; H04L 5/0055; H04L 5/0057; H04L 5/0094; H04L 5/001; H04L 5/0023;
(Continued)

(56) References Cited

U.S. PATENT DOCUMENTS

2022/0085930 A1* 3/2022 Takeda .............. H04W 72/0453
2022/0086676 A1* 3/2022 Al ......................... H04W 72/04

FOREIGN PATENT DOCUMENTS

| CN | 111934837 | 11/2020 |
| WO | 2020/205406 | 10/2020 |
| WO | 2021/003678 | 1/2021 |

OTHER PUBLICATIONS

Moderator (Huawei), "Summary#1 of efficient SCell activation/de-activation mechanism of NR CA", R1-2009800, Oct. 26-Nov. 13, 2020. (From Applicant's IDS) (Year: 2020).*
(Continued)

*Primary Examiner* — Mang Hang Yeung
(74) *Attorney, Agent, or Firm* — Fay Kaplun & Marcin, LLP

(57) ABSTRACT
Embodiments of the present disclosure relate to methods, a terminal device, a network device, and computer program products for SCell management in wireless communication. A terminal device receives from a network device configuration information for configuring a triggering mode. The triggering mode is for triggering activation of a secondary cell of the terminal device and a transmission of a temporary reference signal in the secondary cell. Based on the configured triggering mode, the terminal device receives first triggering information on the activation of the secondary cell and second triggering information on the transmission of the temporary reference signal for performing the activation of the secondary cell. In this way, it is possible to reduce the latency of activation/de-activation procedure for SCG and secondary cells.

11 Claims, 12 Drawing Sheets

(58) Field of Classification Search
CPC ..... H04L 5/0048; H04L 5/005; H04L 5/0051;
H04L 5/0053; H04B 7/063; H04W 76/15;
H04W 24/10; Y02D 30/70
USPC ........................................................ 370/329
See application file for complete search history.

(56) References Cited

OTHER PUBLICATIONS

Frank Long, "LS on temporary RS for efficient SCell activation in NR CA", R1-2009798, Oct. 26-Nov. 13, 2020. (From Applicant's IDS) (Year: 2020).*
Moderator (Huawei), "[Draft] Summary#1 of efficient SCell activation/de-activation mechanism of NR CA", 3GPP TSG RAN WG1 #103-e, R1-2009800, Nov. 13, 2021, 55 sheets.
Frank Long, "LS on temporary RS for efficient SCell activation in NR CA", 3GPP TSG RAN WG1 Meeting #103-e, R1-2009798, Nov. 13, 2020, 3 sheets.
NEC, "Discussion on efficient activation mechanism for SCells", 3GPP TSG RAN WG1 #104-e, R1-2100695, Feb. 5, 2021, 3 sheets.
OPPO, "Discussion on TRS activation for fast SCell activation", 3GPP TSG RAN WG2 Meeting # 11 3 electronic, R2 2100137, Feb. 5, 2021, 5 sheets.
ZTE, "Discussion on Supporting Efficient Activation/De-activation Mechanism for SCells in NR CA", 3GPP TSG RAN WG1 Meeting #104-e, R1-2100112, Feb. 5, 2021, 7 sheets.
Apple, "Discussion on RAN1 LS on temporary RS for efficient SCell activation in NR CA", 3GPP TSG-RAN4 Meeting #98-e, R4-2100236, Feb. 5, 2021, 7 sheets.

* cited by examiner

400

500

600

FLAG TO DIFFERENTIATE DIFFERENT
DCIS

| FDRA: ALL '0' or all '1' | MCS | NDI | RV | HPI | AP | DMRS SEQUENCE | CRC |

←————REPURPOSED AS SAIF AND CSI-RS/TRS REQUEST————→

←————————EXISTING FIELDS FOR DCI 1-1 OR 1_0————————→

700

BLOCK INDEX

| 1 | 2 | 3 | 4 |

| N | CRC |

| PUCCH RESOURCE INDICATOR | PDCCH-TO-HARQ-FEEDBACK TIMING INDICATOR | DAI | SAIF | TRS REQUEST | CSI-RS REQUEST |

800

900

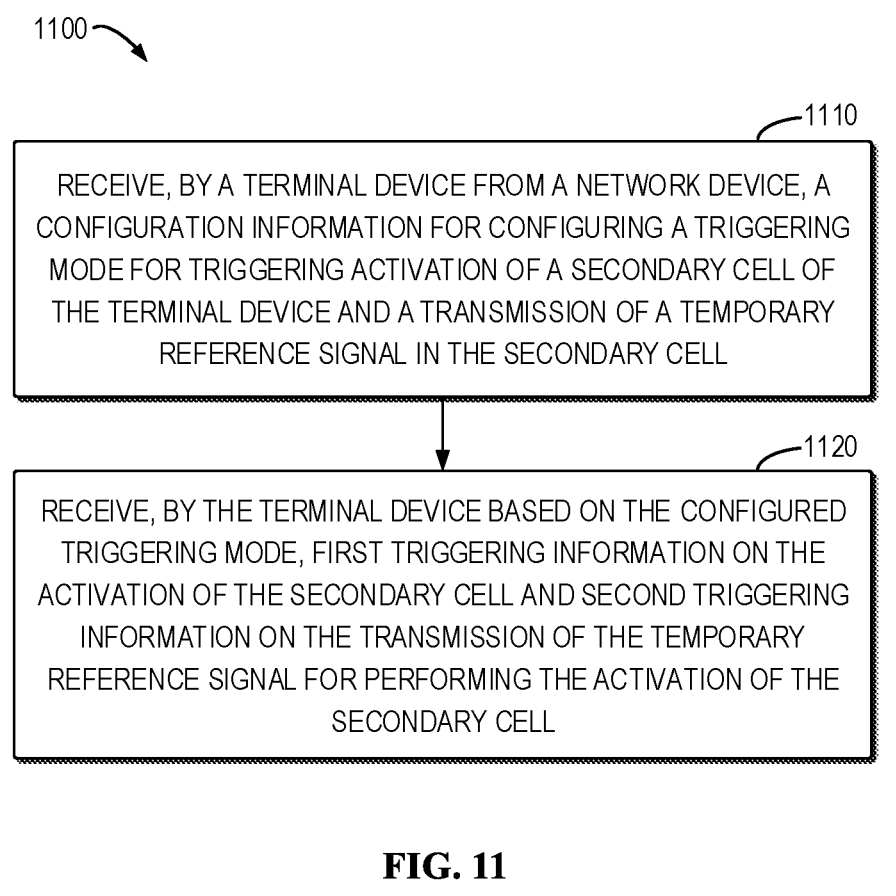

1100

```
┌─────────────────────────────────────────────────────┐ ─1110
│  RECEIVE, BY A TERMINAL DEVICE FROM A NETWORK DEVICE, A │
│ CONFIGURATION INFORMATION FOR CONFIGURING A TRIGGERING  │
│  MODE FOR TRIGGERING ACTIVATION OF A SECONDARY CELL OF  │
│  THE TERMINAL DEVICE AND A TRANSMISSION OF A TEMPORARY  │
│      REFERENCE SIGNAL IN THE SECONDARY CELL             │
└─────────────────────────────────────────────────────┘
```

```
┌─────────────────────────────────────────────────────┐ ─1120
│  RECEIVE, BY THE TERMINAL DEVICE BASED ON THE CONFIGURED │
│   TRIGGERING MODE, FIRST TRIGGERING INFORMATION ON THE  │
│ ACTIVATION OF THE SECONDARY CELL AND SECOND TRIGGERING  │
│  INFORMATION ON THE TRANSMISSION OF THE TEMPORARY       │
│ REFERENCE SIGNAL FOR PERFORMING THE ACTIVATION OF THE   │
│              SECONDARY CELL                             │
└─────────────────────────────────────────────────────┘
```

FIG. 11

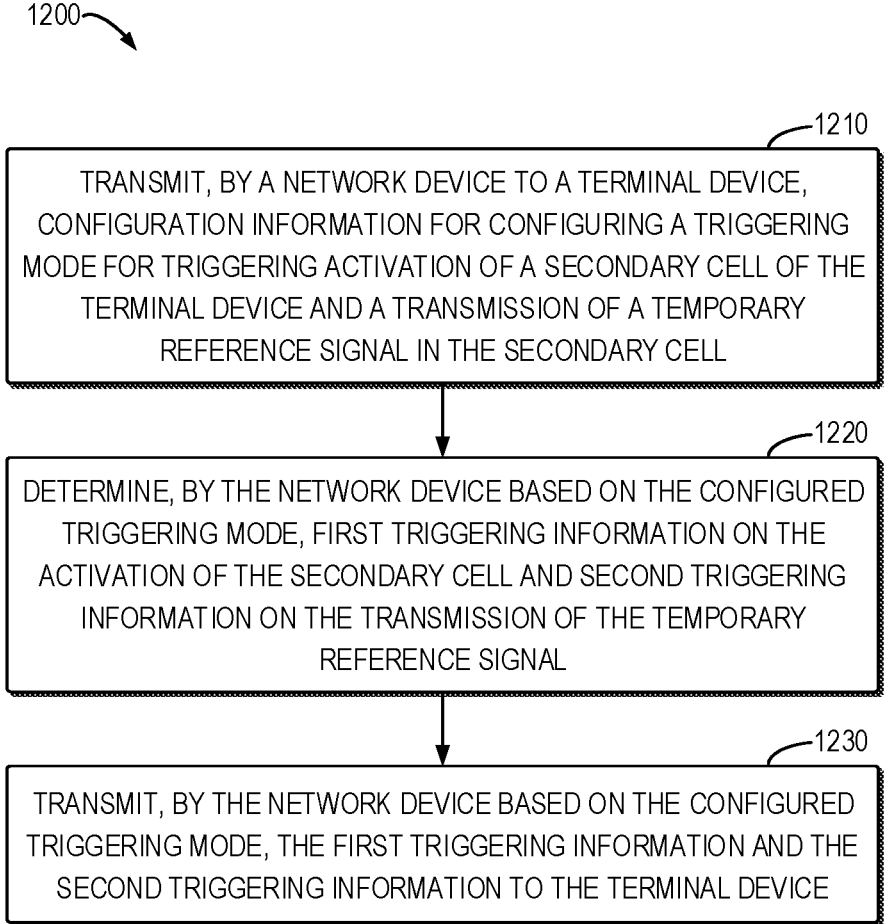

1200

1210

TRANSMIT, BY A NETWORK DEVICE TO A TERMINAL DEVICE, CONFIGURATION INFORMATION FOR CONFIGURING A TRIGGERING MODE FOR TRIGGERING ACTIVATION OF A SECONDARY CELL OF THE TERMINAL DEVICE AND A TRANSMISSION OF A TEMPORARY REFERENCE SIGNAL IN THE SECONDARY CELL

1220

DETERMINE, BY THE NETWORK DEVICE BASED ON THE CONFIGURED TRIGGERING MODE, FIRST TRIGGERING INFORMATION ON THE ACTIVATION OF THE SECONDARY CELL AND SECOND TRIGGERING INFORMATION ON THE TRANSMISSION OF THE TEMPORARY REFERENCE SIGNAL

1230

TRANSMIT, BY THE NETWORK DEVICE BASED ON THE CONFIGURED TRIGGERING MODE, THE FIRST TRIGGERING INFORMATION AND THE SECOND TRIGGERING INFORMATION TO THE TERMINAL DEVICE

PROCESSOR

1320
MEMORY
1330
PROG

SCELL MANAGEMENT IN WIRELESS COMMUNICATION

FIELD

Embodiments of the present disclosure generally relate to the field of telecommunication, and in particular, to methods, a terminal device, a network device, and computer program products for secondary cell (SCell) management in wireless communication.

BACKGROUND

In EUTRA-NR Dual Connectivity (EN-DC), power consumption of a terminal device (for example, user equipment, UE) and network device(s) is a big issue, due to maintaining two radio links simultaneously. In some cases, power consumption of a terminal device in New Radio (NR) is 3 to 4 times higher than in LTE. In EN-DC deployment, the master node (MN) provides a basic coverage.

When data rate requirement of the terminal device changes dynamically, for example from high to low, the secondary node (SN) is worth considering to be activated/deactivated to save network and UE energy consumption. This issue has been discussed in 3rd Generation Partnership Project (3GPP) Release 16 (Rel-16) and is still being studied. However, these solutions do not involve an efficient Secondary Cell Group (SCG) activation/deactivation mechanism, and usually have undesirable latency of activation/de-activation procedure for SCG and SCells.

SUMMARY

In general, embodiments of the present disclosure provide solutions for SCell management in wireless communication.

In a first aspect, there is provided a method performed by a terminal device. The terminal device receives configuration information for configuring a triggering mode from a network device. The triggering mode is for triggering activation of a secondary cell of the terminal device and a transmission of a temporary reference signal in the secondary cell. Based on at least the configured triggering mode, the terminal device receives first triggering information on the activation of the secondary cell and second triggering information on the transmission of the temporary reference signal for performing the activation of the secondary cell.

In a second aspect, there is provided a method performed by a network device. The network device transmits, to a terminal device, configuration information for configuring a triggering mode for triggering activation of a secondary cell of the terminal device and a transmission of a temporary reference signal in the secondary cell. Based on at least the configured triggering mode, the network device determines first triggering information on the activation of the secondary cell and second triggering information on the transmission of the temporary reference signal, and transmits the first triggering information and the second triggering information to the terminal device based on at least the configured triggering mode.

In a third aspect, there is provided a terminal device. The terminal device comprises at least one processor and at least one memory including computer program codes. The at least one memory and the computer program codes are configured to, with the at least one processor, cause the terminal device to receive, from a network device, configuration information for configuring a triggering mode for triggering activation of a secondary cell of the terminal device and a transmission of a temporary reference signal in the secondary cell; and receive, based on at least the configured triggering mode, first triggering information on the activation of the secondary cell and second triggering information on the transmission of the temporary reference signal for performing the activation of the secondary cell.

In a fourth aspect, there is provided a network device. The network device comprises at least one processor and at least one memory including computer program codes. The at least one memory and the computer program codes are configured to, with the at least one processor, cause the network device to transmit, to a terminal device, configuration information for configuring a triggering mode for triggering activation of a secondary cell of the terminal device and a transmission of a temporary reference signal in the secondary cell; determine, based on at least the configured triggering mode, first triggering information on the activation of the secondary cell and second triggering information on the transmission of the temporary reference signal; and transmit, based on at least the configured triggering mode, the first triggering information and the second triggering information to the terminal device.

In a fifth aspect, there is provided a baseband processor of a terminal device. The baseband processor of the terminal device is configured to perform the method according to the first aspect.

In a sixth aspect, there is provided a baseband processor of a network device. The baseband processor of the network device is configured to perform the method according to the second aspect.

In a seventh aspect, there is provided a computer program product comprising program instructions. The program instructions, when being executed on a processor of a device, cause the device to perform the method according to the first aspect.

In an eighth aspect, there is provided a computer program product comprising program instructions. The program instructions, when being executed on a processor of a device, cause the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 11 illustrates a flowchart of an example method performed by a terminal device for triggering a secondary cell in accordance with some embodiments of the present disclosure;

FIG. 12 illustrates a flowchart of an example method performed by a network device for triggering a secondary cell in accordance with some embodiments of the present disclosure.

Throughout the drawings, the same or similar reference numerals represent the same or similar elements.

DETAILED DESCRIPTION OF EMBODIMENTS

Figure 1A:
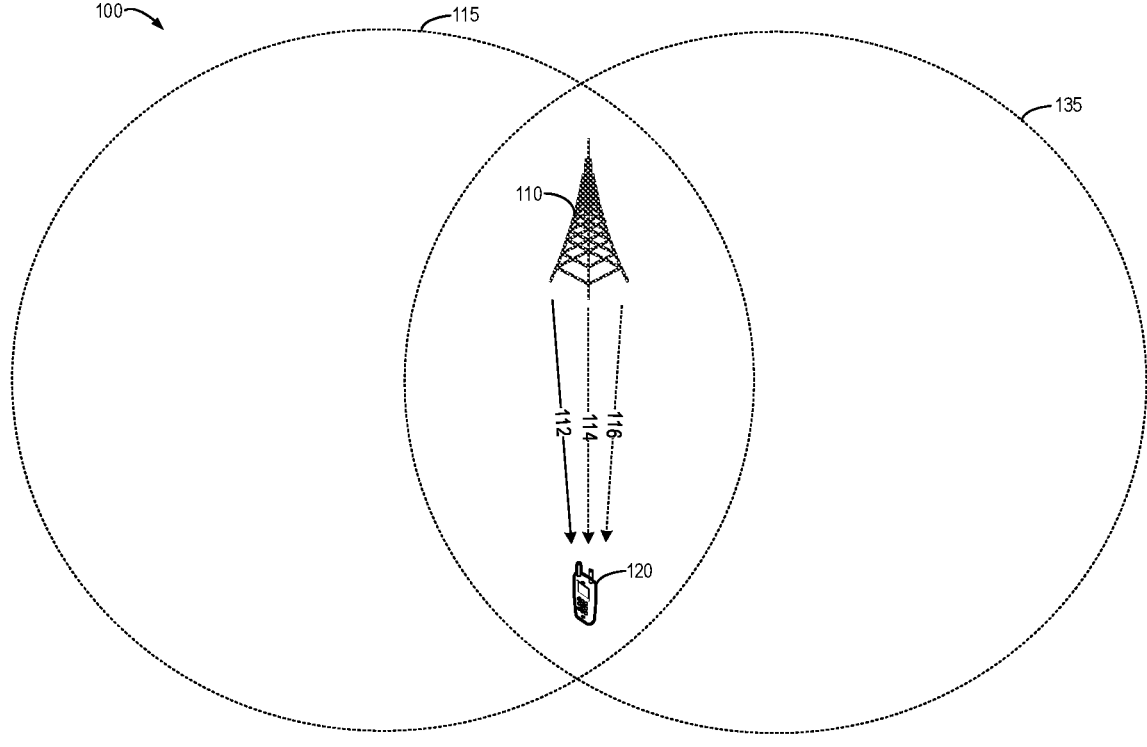
FIG. 1A illustrates a schematic diagram of a communication environment in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node, such as a femto node, a pico node, and the like.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, devices on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

In some embodiments, a terminal device may be connected with a first network device and a second network device. One of the first network device and the second network device may be a master node and the other one may be a secondary node. The first network device and the second network device may use different radio access technologies (RATs). In some embodiments, the first network device may be a first RAT device and the second network device may be a second RAT device. In some embodiments, the first RAT device is an eNB and the second RAT device is a gNB. Information related to different RATs may be transmitted to the terminal device from at least one of the first network device and the second network device. In some embodiments, first information may be transmitted to the terminal device from the first network device and second information may be transmitted to the terminal device from the second network device directly or via the first network device. In some embodiments, information related to configuration for the terminal device configured by the second network device may be transmitted from the second network device via the first network device. Information related to reconfiguration for the terminal device configured by the second network device may be transmitted to the terminal device from the second network device directly or via the first network device.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory (memories) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present disclosure, and may not be limited to a specific term or word. As used herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some embodiments of the present disclosure. It is noted that embodiments of the present disclosure are equally applicable to other resources in other domains.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of embodiments. As used herein, the term "and/or" includes any and all combinations of one or more of the listed terms.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As described above, an efficient SCG (de)activation mechanism is expected to be specified in Release 17. This efficient SCG (de)activation mechanism should also be applied to other multi-RAT dual connectivity (MR-DC) options. Conventionally, to enhance the multi-RAT dual connectivity operation, one of objectives targeted to RAN1 is to specify the following enhancement to MR-DC related scenarios:

Support efficient activation/de-activation mechanism for one SCG and SCells.

Support for SCells applies to NR carrier aggregation (CA), based on RAN1 leading mechanisms [RAN1, RAN2, RAN4].

This objective applies to the frequency range 1 (FR1) and the frequency range 2 (FR2).

Embodiments of the present disclosure provide an efficient SCG (de)activation mechanism. The efficient SCG (de)activation mechanism includes the details of various triggering commands, the temporary reference signal structures and timeline perspectives. According to the proposed mechanism, a terminal device receives from a network device configuration information for configuring a triggering mode. The triggering mode is for triggering activation of a secondary cell of the terminal device and a transmission of a temporary reference signal in the secondary cell. Based on the configured triggering mode, the terminal device receives first triggering information on the activation of the secondary cell and second triggering information on the transmission of the temporary reference signal for performing the activation of the secondary cell. In this way, it is possible to reduce the latency of activation/de-activation procedure for SCG and secondary cells. Principle and implementations of the present disclosure will be described in detail below with reference to the accompanying drawings.

FIG. 1A illustrates a schematic diagram of a communication environment 100 in which some embodiments of the present disclosure can be implemented. As shown in FIG. 1A, the communication environment 100, which may also be referred to as a communication network 100 or a communication system 100, includes a network device 110 serving a terminal device 120 located in a cell 115 provided by the network device 110. In particular, the terminal device 120 may communicate with the network device 110 in the cell 115 via a communication link. For transmissions from the network device 110 to the terminal device 120, the communication link may be referred to as a downlink, whereas for transmissions from the terminal device 120 to the network device 110, the communication link may alternatively be referred to as an uplink.

In some embodiments, the network device 110 and the terminal device 120 may communicate with each other based on allocated resource in unit of symbols in time over an entire slot or a set of symbols within a slot as defined in the 3GPP specifications. For example, for subcarrier spacing configuration μ, slots are numbered $$n_s^\mu \in \left\{0, \ldots , N_{slot}^{subframe,\mu} - 1\right\}$$

in an increasing order within a subframe and $$n_{s,f}^\mu \in \left\{0, \ldots , N_{slot}^{frame,\mu} - 1\right\}$$

in an increasing order within a frame. There are $$N_{symb}^{slot}$$

consecutive Orthogonal Frequency Division Multiplexing (OFDM) symbols in a slot where $$N_{symb}^{slot}$$

depends on the cyclic prefix as given in related 3GPP specifications (TS 38.211). The start of slot $$n_s^\mu$$

in a subframe is aligned in time with the start of OFDM symbol $$n_s^\mu N_{symb}^{slot}$$

in the same subframe. Other related definitions and information of slots can be found in existing or future 3GPP specifications. More generally, the term slot as used herein can refer to any existing defined unit of time or any unit of time to be defined in the future.

In order to enhance the communication performance between the terminal device 120 and the network device 110, in addition to the cell 115, the network device 110 can provide one or more further cells for serving the terminal device 120, for example, through the carrier aggregation technology or other possible technologies. FIG. 1A shows an example of one of such further cells, namely, a cell 135. In the example scenario as shown in FIG. 1A, it is assumed that the cell 115 may be a primary cell to which the terminal device 120 initially connects. In contrast, the cell 135 can be a secondary cell to which the terminal device 120 connects after the primary cell 115 and can be used for improving the communication performance of the terminal device 120.

In some embodiments, the secondary cell 135 can be activated or deactivated based on the communication requirement (such as the data rate requirement) of the terminal device 120. For example, if the terminal device 120 has a relatively high data rate requirement, then the secondary cell 135 may be activated for data communication between the network device 110 and the terminal device 120. Otherwise, if the terminal device 120 has a relatively low data rate requirement, then the secondary cell 135 may be deactivated to save communication resources and the power of the terminal device 120. As shown in FIG. 1A, in order to activate/deactivate the secondary cell 135 for the terminal device 120, the network device 110 may transmit an activation/deactivation command 112 to the terminal device 120 to trigger the activation or deactivation of the secondary cell 135. Upon receiving the activation/deactivation command 112, the terminal device 120 may perform the activation/deactivation of the secondary cell 135 accordingly.

In some embodiments, for the purpose of the activation of the secondary cell 135, the network device 110 can transmit a temporary reference signal (TRS) 114 in the secondary cell 135. The temporary reference signal 114 may be temporarily transmitted in the activation procedure of the secondary cell 135 and can be used by the terminal device 120 to perform time-frequency tracking, for example. Since the temporary reference signal 114 can be transmitted earlier than a normal synchronization signal (for example, Synchronization Signal and PBCH block, SSB) for the time-frequency tracking by the terminal device 120, the transmission of the temporary reference signal 114 in the secondary cell 135 can shorten the latency of the activation procedure of the secondary cell 135. In some embodiments, for the purpose of the activation of the secondary cell 135, the network device 110 can also transmit a channel state information reference signal (CSI-RS) 116 in the secondary cell 135. The CSI-RS 116 can be used by the terminal device 120 to perform a CSI measurement and reporting during the activation of the secondary cell 135. In some embodiments, one or both of the TRS 114 and the CSI-RS 116 may be not transmitted if the secondary cell 135 is activated for the terminal device 120.

It is noted that the activation/deactivation of the secondary cell 135 is discussed above with reference to the example scenario of FIG. 1A in which the primary cell 115 and the secondary cell 135 are provided by the same network device 110. However, it should be noted that in addition to such an example scenario as shown in FIG. 1A, embodiments of the present disclosure are also applicable to other various example scenarios in which the primary cell 115 and the secondary cell 135 can be provided by different network devices, for example, through an inter-network-device carrier aggregation technology or a dual connectivity technology. An example in which the primary cell 115 and the secondary cell 135 are provided by two different network devices will be described below with reference to FIG. 1B.

Figure 1B:
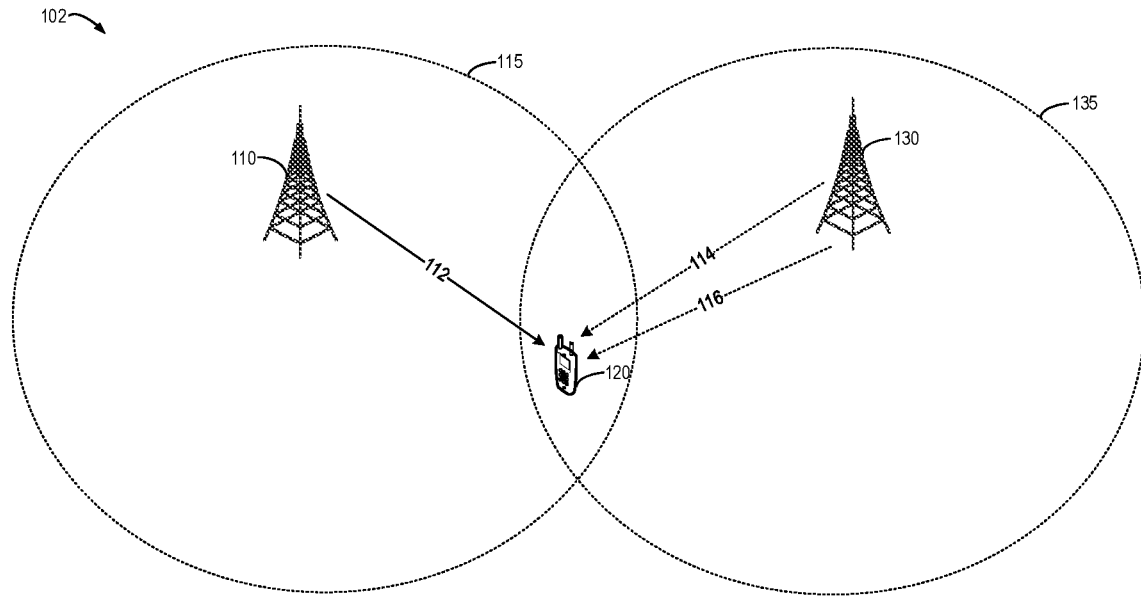
FIG. 1B illustrates a schematic diagram of another communication environment in which some embodiments of the present disclosure can be implemented.

FIG. 1B illustrates a schematic diagram of another communication environment 102 in which some embodiments of the present disclosure can be implemented. Similar to the example scenario of FIG. 1A, the network device 110 in the example scenario as shown in FIG. 1B provides the primary cell 115 of the terminal device 120. Also similar to the example scenario of FIG. 1A, the terminal device 120 in the example scenario as shown in FIG. 1B can also be configured with the secondary cell 135 for improving the communication performance of the terminal device 120. Different from the example scenario of FIG. 1A, the secondary cell 135 in the example scenario as shown in FIG. 1B can be provided by a network device 130 other than the network device 110. In some embodiments, the terminal device 120 may connect to both the primary cell 115 and the secondary cell 135 based on the inter-network-device CA or the dual connectivity technology.

For example, in the dual connectivity technology, the primary cell 115 can be one of the master cell group (MCG) provided by the network device 110, and the secondary cell 135 may be one of the secondary cell group (SCG) provided by the network device 130. In some embodiments, the network device 110 and the network device 130 can be based on the same radio access technology (RAT) or two different RATs. In addition, there may be necessary communications between the network device 110 and the network device 130 for enabling the inter-network-device CA or the dual connectivity for the terminal device 120. The procedure of the activation/deactivation of the secondary cell 135 in FIG. 1B may be largely analogous to that as described above with reference to FIG. 1A, except that the TRS 114 and the CSI-RS 116 may be transmitted by the network device 130 instead of the network device 110. It should be noted that embodiments of the present disclosure do not limited to the example scenarios as shown in FIGS. 1A and 1B, but are also applicable to any possible scenarios in which a SCG or SCells can be activated or deactivated.

It is to be understood that the number of the terminal devices, the number of the network devices, the number of cells, and the number of communication links as shown in FIGS. 1A and 1B are only for the purpose of illustration without suggesting any limitations. The communication environment 100 and 102 may include any suitable number of terminal devices, any suitable number of network devices, any suitable number of other communication devices, any suitable number of cells, and any suitable number of communication links adapted for implementing embodiments of the present disclosure.

In addition, it is to be appreciated that there may be various wireless communications as well as wireline communications (if needed) among all the communication devices in FIGS. 1A and 1B. Moreover, it is noted that although the network device 110 and the network device 130 are schematically depicted as base stations and the terminal device 120 is schematically depicted as a mobile phone in FIGS. 1A and 1B, it is understood that these depictions are only for example without suggesting any limitation. In other embodiments, the network device 110 and the network device 130 may be any other wireless network devices, and the terminal device 120 may be any other wireless communication device.

The communications in the communication environment 100 or 102 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2A:
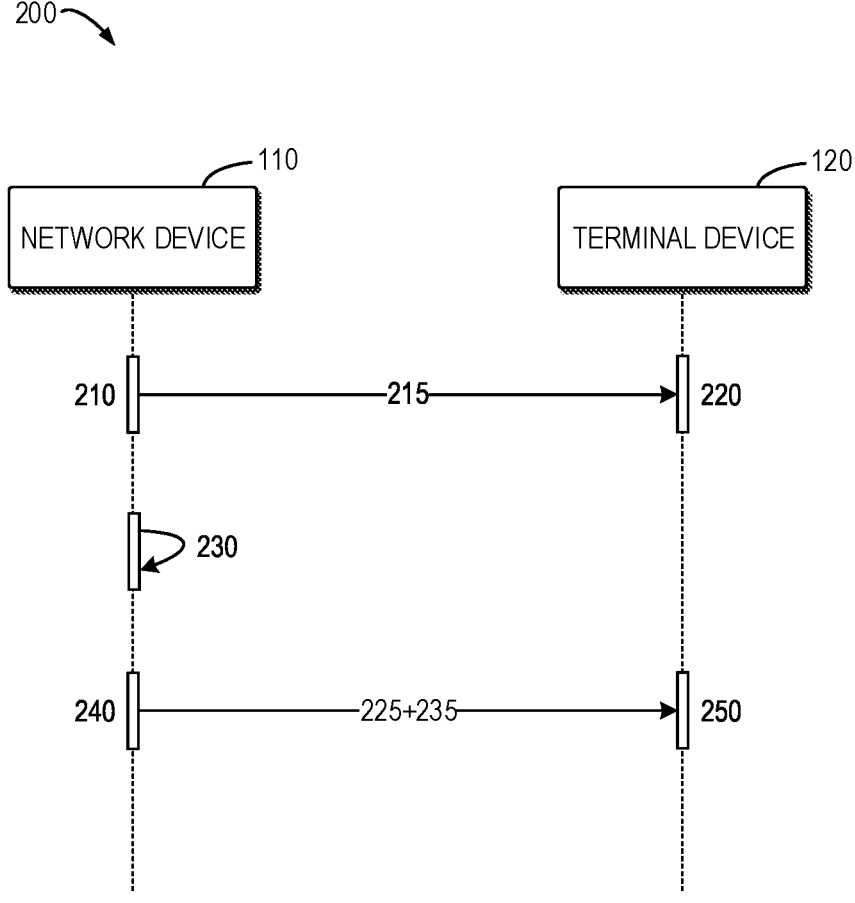
FIG. 2A illustrates an example communication process between a network device and a terminal device in accordance with some embodiments of the present disclosure.
Figure 2B:
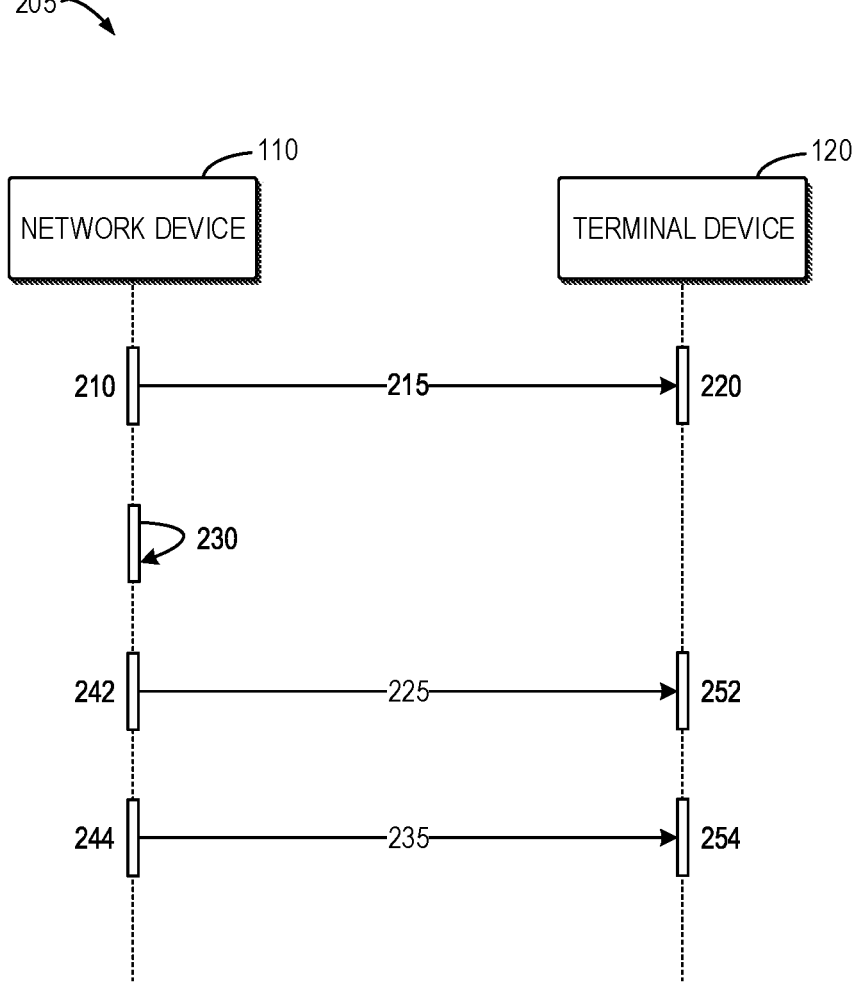
FIG. 2B illustrates another example communication process between a network device and a terminal device in accordance with some embodiments of the present disclosure.

FIGS. 2A and 2B illustrate example communication processes 200 and 205 between the network device 110 and the terminal device 120, respectively, in accordance with some embodiments of the present disclosure. For the purpose of discussion, the communication processes 200 and 205 will be described with reference to FIGS. 1A and 1B. However, it would be appreciated that the communication processes 200 and 205 may be equally applicable to any other communication scenarios where two communication devices communicate with each other. Through the communication process 200 or 205, it is possible for the terminal device 120 to reduce the latency of activation/de-activation procedure for SCG or SCells.

In both FIGS. 2A and 2B, the network device 110 transmits (210) configuration information 215 to the terminal device 120. The configuration information 215 can configure a triggering mode for triggering the activation of the secondary cell 135 of the terminal device 120 and the transmission of the temporary reference signal 114 in the secondary cell 135. For example, the triggering mode can also be referred to as a parameter which may be introduced to indicate one of multiple (for example, two) modes for SCell activation/deactivation operation.

In general, the network device 110 can transmit the configuration information 215 indicating the triggering mode, namely the activation/deactivation mode configuration parameter, via various signaling messages. For example, the configuration information 215 may be transmitted via a system information block (SIB) message. That is, the configuration parameter may be informed to the terminal device 120 by system information block (SIB) message. In this way, the availability of the configuration information 215 to the terminal device 120 can be enhanced. Additionally or alternatively, the configuration information 215 may be transmitted via a radio resource control (RRC) message. For example, the configuration information 215 may be provided to the terminal device 120 by using dedicated RRC signaling as part of SCell Addition/Modification message on a per cell basis. In this way, the configuration granularity of the configuration information 215 may be improved. Additionally or alternatively, the configuration information 215 may be transmitted via Downlink Control Information (DCI) on a Physical Downlink Control Channel (PDCCH). As such, the transmission latency of the configuration information 215 can be minimized. For example, the configuration information 215 may be provided as part of LI triggering commands, such as, DCI on PDCCH or MAC-CE on PDSCH.

In some embodiments, the configuration information 215 may indicate a first triggering mode (also referred to as Mode-1). In the first triggering mode, the triggering of the transmission of the temporary reference signal 114 can depend on the triggering of the activation of the secondary cell 135. In other words, if the activation of the secondary cell 135 is triggered, then the transmission of the temporary reference signal 114 is also triggered. That is, the trigger of the temporary RS (TRS) is coupled together with the trigger of SCell activation in Mode-1. In this way, the temporary reference signal 114 can be always transmitted in the secondary cell 135 if the secondary cell 135 is to be activated, thus the latency of the activation procedure of the secondary cell 135 for the terminal device 120 can be reduced.

In some other embodiments, the configuration information 215 can indicate a second triggering mode (also referred to as Mode-2). In the second triggering mode, the triggering of the activation of the secondary cell 135 and the triggering of the transmission of the temporary reference signal 114 may be independent of each other. That is, in the case that the activation of the secondary cell 135 is triggered, the transmission of the temporary reference signal 114 may be triggered or may be not triggered. In other words, the temporary RS triggering and the SCell activation triggering (and also the CSI-RS triggering in some cases) can be decoupled with each other in Mode-2. This option provides flexibility for the scheduler of the network device 110 (such as a gNB) to tradeoff between the reduced latency and DL overhead possibly triggering one of them, instead of always on or off together.

On the other side of the communication process 200 or 205, the terminal device 120 receives (220) the configuration information 215 from the network device 110. Depending on the signaling message used by the network device 110 to transmit the configuration information 215, the terminal device 120 can receive the configuration information 215 via corresponding signaling message. For example, the configuration information 215 may be received via a SIB message. Additionally or alternatively, the configuration information 215 may be received via an RRC message. Additionally or alternatively, the configuration information 215 may be received via a DCI on a PDCCH.

Based on the received configuration information 215, the terminal device 120 can determine the triggering mode for triggering the activation of the secondary cell 135 and the transmission of the temporary reference signal 114 in the secondary cell 135. For example, if the network device 110 indicates the first triggering mode through the configuration information 215, the terminal device 120 may determine that the activation of the secondary cell 135 and the transmission of the temporary reference signal 114 are together triggered or together not triggered. Alternatively, if the network device 110 indicates the second triggering mode through the configuration information 215, the terminal device 120 can determine that the activation of the secondary cell 135 and the transmission of the temporary reference signal 114 are triggered separately.

In both FIGS. 2A and 2B, the network device 110 determines (230) first triggering information 225 and second triggering information 235 based on the configured triggering mode. The first triggering information 225 is used for the activation of the secondary cell 135. For example, the first triggering information 225 may indicate whether the activation of the secondary cell 135 is triggered or not. In other words, the first triggering information 225 can indicate whether the secondary cell 135 is to be activated for the terminal device 120. Alternatively, the first triggering information 225 can indicate the activation/deactivation state of the secondary cell 135 by setting the value to be '1' or '0' correspondingly. The second triggering information 235 is used to indicate the transmission of the temporary reference signal 114. For example, the second triggering information 235 can indicate whether the transmission of the temporary reference signal 114 is triggered or not. That is, the second triggering information 235 can indicate whether the temporary reference signal 114 is to be transmitted in the secondary cell 135. In some embodiments, the second triggering information 235 may indicate a set of resources for transmitting the temporary reference signal 114, so as to implicitly indicate that the transmission of the temporary reference signal 114 is triggered.

After determining (230) the first triggering information 225 and second triggering information 235, the network device 110 transmits the first triggering information 225 and the second triggering information 235 to the terminal device 120 based on the configured triggering mode. For example, as shown in FIG. 2A, the network device 110 may transmit (240) the pair of the first triggering information 225 and the second triggering information 235 via a single triggering command. That is, these two operations related to the activation of the secondary cell 135 and the transmission of the TRS 114 can be integrated into a single triggering signaling that is transmitted on an activated cell. This may be the case that the first triggering mode is configured for the terminal device 120. In this way, the signaling overhead can be reduced due to the use of the single triggering signaling. In some embodiments, the single triggering command can further trigger a transmission of an aperiodic CSI-RS 116 and an associated CSI reporting. In other words, this common signal is also used to trigger aperiodic CSI-RS transmission and the associated CSI reporting. As such, the triggering efficiency of the SCell activation, TRS transmission, and CSI-RS transmission can be increased.

Alternatively, as shown in FIG. 2B, in case the first triggering mode is configured for the terminal device 120, the network device 110 can transmit (242) the first triggering information 225 to the terminal device 120. In addition, the network device 110 may transmit (244) the second triggering information 235 to the terminal device 120. In other words, even if the first triggering mode is configured for the terminal device 120, the network device 110 may transmit the pair of the first triggering information 225 and the second triggering information 235 via different triggering commands. As such, the transmission flexibility of the first triggering information 225 and the second triggering information 235 can be increased. In some embodiments, although two separate triggering commands are used, these two triggering commands may be together transmitted or together not transmitted, namely, once one triggering command is transmitted, the other triggering command has to be transmitted as well.

In some embodiments, the second triggering mode is configured for the terminal device 120. In this event, the first triggering information 225 and the second triggering information 235 can be separately transmitted to the terminal device 120. For example, as shown in FIG. 2B, the network device 110 may transmit (242) the first triggering information 225 via a first triggering command. Also, the network device 110 may transmit (244) the second triggering information 235 via a second triggering command separate from the first triggering command. As such, the transmission flexibility of the first triggering information 225 and the second triggering information 235 can be increased. In the second triggering mode, since the triggering of the activation of the secondary cell 135 and the triggering of the transmission of the temporary reference signal 114 are independent of each other, the first triggering command and the second triggering command need not to be together transmitted or together not transmitted.

In some embodiments, the network device 110 may further transmit third triggering information to the terminal device 120 via a third triggering command. The third triggering information is about the transmission of the CSI-RS 116 in the secondary cell 135. In this way, the triggering command for triggering the CSI-RS 116 can have more transmission flexibility. For example, the third triggering information can indicate whether the transmission of the CSI-RS 116 is triggered or not. That is, the third triggering information can indicate whether the CSI-RS 116 is to be transmitted in the secondary cell 135. In some embodiments, the third triggering information may indicate a set of resources for transmitting the CSI-RS 116, so as to implicitly indicate that the transmission of the CSI-RS 116 is triggered.

On the other side of the communication process 200 or 205, the terminal device 120 receives the first triggering information 225 and the second triggering information 235 based on the configured triggering mode. For example, as shown in FIG. 2A, if the first triggering mode is configured for the terminal device 120, the terminal device 120 may receive (250) the pair of the first triggering information 225 and the second triggering information 235 via a single triggering command. Alternatively, as shown in FIG. 2B, if the first triggering mode is configured for the terminal device 120, the terminal device 120 may receive the pair of the first triggering information 225 and the second triggering information 235 via different triggering commands. The transmissions of the two different triggering commands are coupled together such that if one triggering command is transmitted then the other triggering command is also transmitted.

In some embodiments, the second triggering mode is configured for the terminal device 120. In this event, the first triggering information 225 and the second triggering information 235 can be separately received by the terminal device 120. For example, as shown in FIG. 2B, the terminal device 120 may receive (252) the first triggering information 225 via the first triggering command. Also, the terminal device 120 may receive (254) the second triggering information 235 via the second triggering command separate from the first triggering command. In some embodiments, if the network device 110 further transmits the third triggering information on the transmission of the CSI-RS 116, the terminal device 120 may receive also the third triggering information from the network device 110 via the third triggering command. Based on the third triggering information, the terminal device 120 can determine whether the CSI-RS 116 is to be transmitted in case that the secondary cell 135 is to be activated.

In some embodiments, it is assumed that the second triggering information 235 indicates triggering of the transmission of the temporary reference signal 114. Then, the terminal device 120 may perform a time-frequency tracking based on the temporary reference signal 114 during the activation of the secondary cell 135. In addition to the time-frequency tracking, the terminal device 120 may also perform a CSI measurement based on the temporary reference signal 114. In other words, the triggered TRS 114 is also used by the terminal device 120 for CSI measurement and reporting with restriction of rank indication (RI) v=1. In this way, since the CSI measurement can be performed using the TRS 114 which is earlier than the CSI-RS 116, the activation procedure of the secondary cell 135 for the terminal device 120 can be further shortened.

In some other embodiments, it is assumed that the second triggering information 235 indicates triggering of paired transmissions of the TRS 114 and CSI-RS 116. The paired transmissions may include the transmission of the temporary reference signal 114 in a first resource set and the transmission of the CSI-RS 116 in a second resource set. In these embodiments, the terminal device 120 can perform a time-frequency tracking based on the temporary reference signal 114. Additionally, the terminal device 120 can perform a CSI measurement based on the CSI-RS signal 116. In other words, separate CSI-RS resource sets may be triggered for tracking purpose (namely, TRS) and the CSI measurement/reporting. As such, the TRS for the CSI measurement/reporting cannot be limited to rank indication (RI) v=1, thereby further optimizing the activation procedure of the secondary cell 135 for the terminal device 120.

As mentioned above, the first triggering information 225 and the second triggering information 235 may be transmitted in a single triggering command. In various embodiments, such a single triggering command can be carried in different signaling messages. In other words, different approaches can be considered for triggering command design to enable the Mode-1 operation as discussed above. As a first option, the single triggering command can be carried in a media access control (MAC) control element (CE). For example, a new MAC CE may be introduced to trigger both the TRS transmission and the SCell activation simultaneously. In this way, the possible impacts on the existing protocols may be minimized. In some embodiments, the new MAC CE may be identified by a MAC subhead with a dedicated logical channel identifier (LCID), such that the terminal device 120 can be aware that the MAC CE is used for the purpose of the SCell activation and the TRS transmission.

In some embodiments, the MAC CE may include a set of activation/deactivation fields and one or more temporary reference signal (TRS) fields. The set of activation/deactivation fields can be used for a set of secondary cells configured for the terminal device 120, respectively. Each of the set of activation/deactivation fields may indicate an activation/deactivation state of a corresponding one of the set of secondary cells. As such, the activation/deactivation state of each configured SCell can be indicated individually, thereby maximizing the control flexibility of the activation/deactivation state of the SCells. For example, one of this set of fields can be referred to as $C_i$ and may indicate the activation/deactivation status of the SCell with SCellIndex i, else the MAC entity shall ignore the field. The $C_i$ field can be set to 1 to indicate that the SCell with SCellIndex i shall be activated and there is associated TRS field. The Ci field may be set to 0 to indicate that the SCell with SCellIndex i shall be deactivated.

The one or more TRS fields may be associated with one or more secondary cells to be in an activated state among the set of secondary cells configured for the terminal device 120. For example, the one or more TRS fields may indicate resource sets for transmitting respective temporary reference signals in the secondary cells to be in the activated state. That is, the one or more TRS fields may indicate the triggered TRS resource set associated with triggering state for the activated CC. In this way, the TRS resources can be indicated for all the secondary cells to be activated, thereby facilitating the activation procedures of the secondary cells to be activated.

In some embodiments, the one or more TRS fields may be one TRS field commonly applying to multiple secondary cells to be in the activated state. In other words, a single TRS field may be included in the MAC CE and commonly applied for all the CCs being activated. As such, the signaling overhead for the TRS field can be minimized. In some other embodiments, the one or more TRS field may be multiple TRS fields applying to multiple secondary cells to be in the activated state, respectively. That is, different TRS fields may be included for different CCs and the number of TRS fields may be included in ascending order based on $C_i$. In this way, the configuration flexibility of the TRS resources for the secondary cells to be activated can be maximized.

There are various designs that may be considered for the TRS field. In some embodiments, each of the at least one TRS field can include a first part and a second part. The first part may indicate a first resource set for transmitting a temporary reference signal. The second part may indicate a second resource set for transmitting a CSI-RS. In this way, the Rel-15/16 CSI request field can be reused, which results in up to 6 bits for each TRS field. For this design, two CSI request fields may be included in the new MAC CE, one for the TRS triggering and the other for the CSI measurement and reporting.

In other exemplary embodiments, the terminal device 120 can be configured with a set of pairs of resource sets for each secondary cell. Each pair of resource sets may include a first resource set and a second resource set. The first resource set can be used for transmitting a temporary reference signal. The second resource set may be used for transmitting a CSI-RS. In addition, each of the multiple TRS fields in the MAC CE can indicate one of the set of pairs of resource sets for a corresponding secondary cell among the multiple secondary cells to be in the activated state. In other words, the terminal device 120 may be provided with a set of paired CSI-RS configurations for each SCell to operate fast SCell activation, namely, <CSI-RS resource set #1 (for transmitting the TRS), CSI-RS resource set #2>. Each pair of the CSI-RS configurations can be identified by a unique TRS field value. In this way, the transmission resource sets for the TRS and the CSI-RS can be indicated using one indication, thereby reducing the signaling overhead.

In some embodiments, the terminal device 120 may be configured with a single pair of resource sets for one of the multiple secondary cells to be in the activated state. In this event, the multiple TRS fields may exclude a TRS field for the secondary cell associated with the single pair of resource sets. That is, if a single pair of CSI-RS configuration is provided for a given CC, TRS field is not present. In this case, the terminal device 120 may assume the configured CSI-RS pairs are transmitted for the CC that is being activated by the triggering command. In this way, the signaling overhead for the TRS fields can be reduced. In some other embodiments, one of the multiple secondary cells to be in the activated state may be already in the activated state when the terminal device 120 receives the MAC CE. In this situation, the multiple TRS fields can exclude a TRS field for the secondary cell already in the activated state, since the secondary cell needs not to be activated. In other word, TRS is present on condition that the CC is being activated from de-activated state. Otherwise, this TRS field is not present for an activated CC even the corresponding $C_i$ is set to '1.' In this way, the signaling overhead for the TRS fields can be reduced.

Figure 3:
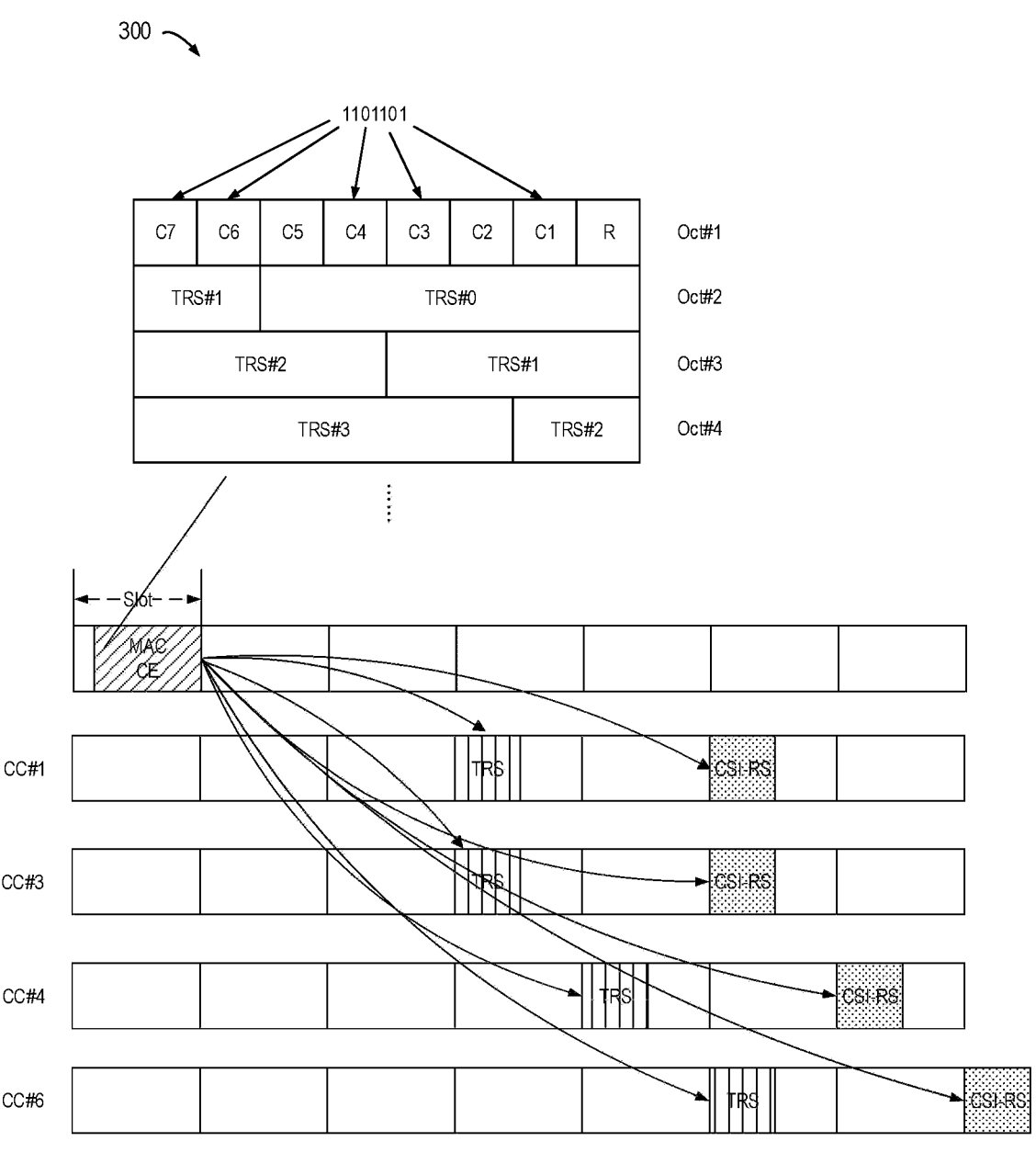
FIG. 3 illustrates an example of a media access control (MAC) control element (CE) to trigger paired temporary reference signal (TRS) and channel state information reference signal (CSI-RS) in accordance with some embodiments of the present disclosure.

FIG. 3 illustrates an example 300 of a MAC CE to trigger paired TRS and CSI-RS in accordance with some embodiments of the present disclosure. As shown in the example 300 of FIG. 3, there is provided one exemplified new MAC to activate SCell and trigger TRS or <TRS, CSI-RS> pairs at the same time. It is assumed that eight CCs are configured for the terminal device 120 (for example, a UE). The network device 110 (for example, a gNB) intends to activate SCell index 1/3/4/6 simultaneously due to a large amount of DL packets. It is further assumed that SCell with index 7 has already been activated and the network device 110 intends to keep it active.

Referring to the example 300 of FIG. 3, the field CL would be set as '1101101' for this purpose with the least significant bit (LSB) being reserved as 'R.' In addition, the TRS #0/#1/#2/#3 are included in the same triggering command MAC CE and sequentially associated with the CCs being activated in the same MAC CE, namely, SCell index 1/3/4/6. Note that, there is no TRS field present for SCell index 7 even if the associated $C_7$ is set to be '1' in accordance with this design since it has already been activated when the terminal device 120 receives the MAC CE. Different slot offsets may be assumed for example, due to different SCS for different CCs. Note that, for the design of TRS field Option 1 as discussed above, a common TRS field can be included in the MAC CE and may be applied for all CCs being activation.

As a second option of the signaling message for transmitting the single triggering command as shown in FIG. 2A, the single triggering command can be carried in a modified DCI used for scheduling of a PUSCH in one cell. In other words, fast SCell activation and aperiodic TRS/CSI-RS transmission can be jointly triggered by a new DCI format. In this way, the latency of the triggering of the SCell activation and aperiodic TRS/CSI-RS transmission can be further reduced compared to using a MAC CE message. It is noted that in Rel-15/16 NR, aperiodic CSI-RS (including TRS) is triggered by UL grant only. In some embodiments of the present disclosure, enhancement to the existing DCI Format can be provided to support new functions.

More specifically, in some embodiments, the modified DCI may include an added activation indicator field. The added activation indicator field may include a set of bits for a set of secondary cells configured for the terminal device 120. Each of the set of bits can indicate an activation/deactivation state of corresponding one of set of the secondary cells. In this way, the control flexibility and granularity of the set of the secondary cells can be maximized. Alternatively, each of the set of bits can indicate an activation/deactivation state of a predetermined group of secondary cells among the set of secondary cells. As such, the signaling overhead for the added activation indicator field can be reduced.

Alternatively or additionally, the modified DCI may include an added TRS request field. The added TRS request field can include the second triggering information 225 for triggering the transmission of the TRS 114. In this way, the triggering of the transmission of the TRS 114 can be indicated in the modified DCI. Alternatively or additionally, the modified DCI can include an added field for configuring a feedback (for example, a HARQ feedback) to be transmitted by the terminal device 120 for the modified DCI. As such, the transmission reliability of the modified DCI can be increased. Alternatively or additionally, the modified DCI may include a repurposed CSI-RS request field. The repurposed CSI-RS request field can be used for indicating a transmission of an aperiodic CSI-RS and an associated CSI reporting. In this way, the existing CSI-RS request field in the DCI format can be reused, thereby simplifying the design of the modified DCI.

Figure 4:
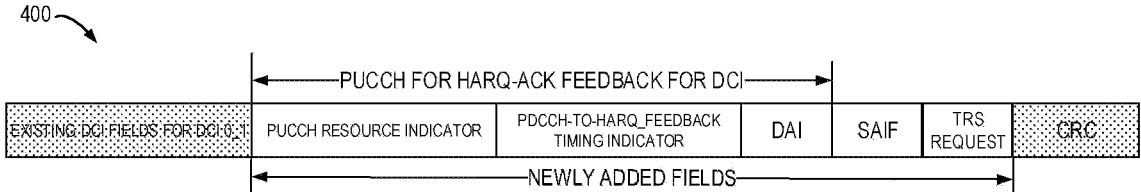
FIG. 4 illustrates an example of new downlink control information (DCI) Format 0_1 to support a fast SCell activation/de-activation operation in accordance with some embodiments of the present disclosure.

FIG. 4 illustrates an example 400 of a new DCI format 0_1 to support a fast SCell activation/de-activation operation in accordance with some embodiments of the present disclosure. As shown in the example 400 of FIG. 4, the current DCI Format 0_1 (namely, UL grant) may be enhanced to support fast SCell activation with adding a couple of new fields. For example, a first new field may be a PUCCH resource indicator, which can include 3 bits. A second new field may be a PDCCH-to-HARQ_feedback timing indicator, which may include 0, 1, 2, or 3 bits. A third new field can be a downlink assignment index, which may include 2 bits if Type-2 HARQ-ACK codebook is configured. Otherwise, the downlink assignment index may include 0 bits. A fourth new field can be an SCell Activation Indicator field (SAIF), which may include a bitmap with S bits, where S is determined according to the number of SCells and each SAIF bit corresponds to one of the SCells. In some designs, in order to reduce the signaling overhead, the SCells may be divided into a set of SCell groups and each SAIF bit can correspond to one of the SCell group(s). Further, two CSI-RS request fields may be included to trigger TRS and CSI-RS for CSI reporting separately.

As a third option of the signaling message for transmitting the single triggering command as shown in FIG. 2A, the single triggering command may be carried in a modified DCI used for scheduling of a PDSCH in one DL cell. In this way, the latency of the triggering of the SCell activation and aperiodic TRS/CSI-RS transmission can be further reduced compared to using a MAC CE message. For example, the existing DCI Format 1_1 (namely, DL grant) may be enhanced to support fast SCell activation and A-TRS and CSI-RS triggering by adding a couple of new fields and support fast SCell activation by using a DCI with scheduling PDSCH.

More specifically, in some embodiments, the modified DCI may include an activation indicator field. The activation indicator field can include a set of bits for a set of secondary cells configured for the terminal device. Each of the set of bits may indicate an activation/deactivation state of corresponding one of the set of secondary cells. In this way, the control flexibility and granularity of the set of the secondary cells can be maximized. Alternatively, each of the set of bits may indicate an activation/deactivation state of a predetermined group of secondary cells among the set of secondary cells. As such, the signaling overhead for the added activation indicator field can be reduced.

Alternatively or additionally, the modified DCI may include an added TRS request field. The added TRS request field may include the second triggering information 225 for triggering the transmission of the TRS 114. In this way, the triggering of the transmission of the TRS 114 can be indicated in the modified DCI. Alternatively or additionally, the modified DCI may include an added CSI-RS request field for indicating a transmission of an aperiodic CSI-RS and an associated CSI reporting. In this way, the triggering of the transmission of the aperiodic CSI-RS and an associated CSI reporting can be indicated in the modified DCI. Alternatively or additionally, the modified DCI may include a repurposed field for configuring a feedback (for example, a HARQ feedback) to be transmitted by the terminal device 120 for the modified DCI instead of a transmission of a physical downlink shared channel (PDSCH) scheduled by the modified DCI. In other words, the feedback is for the modified DCI itself but not for the scheduled PDSCH as in a conventional design. In this way, the existing HARQ field in the DCI format can be reused, thereby simplifying the design of the modified DCI.

In some embodiments, the design of the activation indicator field of the modified DCI may have different choices. For example, the activation indicator field may be an added activation indicator field. The added activation indicator field may include the set of bits, each of which indicates an activation/deactivation state of corresponding one of the set of secondary cells. In this way, the control flexibility and granularity of the set of the secondary cells can be maximized.

As another example, the activation indicator field can be a repurposed activation indicator field originally indicating a dormancy state of a predetermined group of secondary cells among the set of secondary cells. The repurposed activation indicator field may include the set of bits, each of which indicates an activation/deactivation state of a predetermined group of secondary cells, instead of indicating the dormancy state of the predetermined group of secondary cells. As such, the existing dormancy field in the DCI format can be reused, thereby simplifying the design of the modified DCI. In some embodiments, the modified DCI may further include a bit for indicating whether the activation indicator field is repurposed for indicating the activation/deactivation state of predetermined group of secondary cells. As such, the potential ambiguity in the function of the field can be eliminated.

Figure 5:
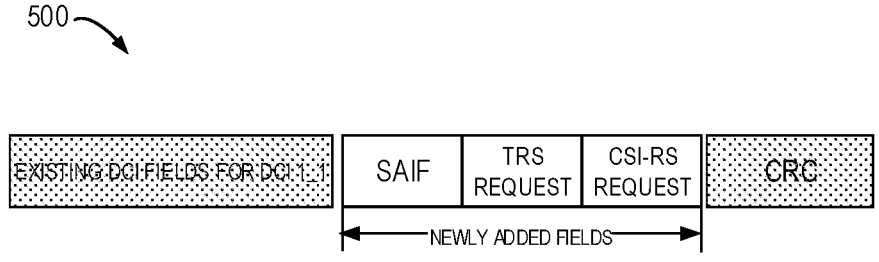
FIG. 5 illustrates an example of a new DCI Format 1_0 to support a fast SCell activation/de-activation operation in accordance with some embodiments of the present disclosure.

FIG. 5 illustrates an example 500 of a new DCI format 1_0 to support a fast SCell activation/de-activation operation in accordance with some embodiments of the present disclosure. As shown in the example 500 of FIG. 5, some new fields are added for supporting fast SCell activation by using a DCI with scheduling PDSCH. For example, the first new field may be an SCell Activation Indicator field (SAIF), which may be the same as that in the example 400 of FIG. 4. That is, the SAIF field can include a bitmap with S bits, where S may be determined according to the number of SCells and each SAIF bit may correspond to one of the SCells.

In some designs, in order to reduce the signaling overhead, the SCells may be divided into a set of SCell groups and each SAIF bit may correspond to one of the SCell group(s). For this design, the existing SCell dormancy indication field may be re-purposed as SAIF. To differentiate these two functions, 1-bit flag field 'F' may be added and 'F=0' may indicate that the field is used for SCell dormancy. On the other hand, 'F=1' may indicate that the field is used for SAIF. In some designs, two CSI request fields may be included to trigger TRS and CSI-RS for CSI reporting separately. In addition, it is noted that there are HARQ fields in the existing DCI fields for DCI 1_1 for configuring the HARQ feedbacks for the scheduled PDSCH by the DCI 1_1. In some embodiments, these HARQ fields can be repurposed to configure the HARQ feedbacks for the modified DCI 1_1 itself.

As a fourth option of the signaling message for transmitting the single triggering command as shown in FIG. 2A, the single triggering command may be carried in downlink control information (DCI). The DCI is repurposed for carrying the single triggering command without scheduling a transmission or reception of a physical shared channel. In this way, the latency of the triggering of the SCell activation and aperiodic TRS/CSI-RS transmission can be further reduced compared to using a MAC CE message. In some embodiments, the DCI may be a DCI used for scheduling of a PUSCH in one cell. Alternatively, the DCI may be a DCI used for scheduling of a PDSCH in one DL cell. In some embodiments, a frequency domain resource allocation (FRDA) field of the DCI may be repurposed to indicate that the DCI is used for carrying the single triggering command, so as to eliminate the potential ambiguity in the function of the DCI.

In some embodiments, the DCI may include an activation indicator field. The activation indicator field may have a set of bits for a set of secondary cells configured for the terminal device 120. Each of the set of bits may indicate an activation/deactivation state of corresponding one of the set of secondary cells. In this way, the control flexibility and granularity of the set of the secondary cells can be maximized. Alternatively, each of the set of bits may indicate an activation/deactivation state of a predetermined group of secondary cells among the set of secondary cells. As such, the signaling overhead for the added activation indicator field can be reduced. Alternatively or additionally, the DCI may include a TRS request field. The TRS request field may include the second triggering information 225 for triggering the transmission of the TRS 114. In this way, the triggering of the transmission of the TRS 114 can be indicated in the DCI. Alternatively or additionally, the DCI can include a CSI-RS request field. The CSI-RS request field can be used for indicating a transmission of an aperiodic CSI-RS and an associated CSI reporting. In this way, the triggering of the transmission of aperiodic CSI-RS and an associated CSI reporting can be indicated in the DCI.

In some embodiments, various fields of the DCI may be repurposed to indicate the activation indicator field, the TRS request field, or the CSI-RS request field. For example, one or more of the field of modulation and coding scheme of transport block 1, the field of new data indicator of transport block 1, the field of redundancy version of transport block 1, the field of hybrid automatic repeat request (HARQ) process number, the field of antenna ports, and the field of demodulation reference signal (DMRS) sequence initialization can be reused for carrying the information bits of the activation indicator field, the TRS request field, or the CSI-RS request field. Because these fields need not to carrying originally intended bits, in the case that the DCI does not schedule a transmission or reception of a physical shared channel. In this way, the existing fields in the DCI format can be reused, thereby simplifying the design of the modified DCI.

Figure 6:
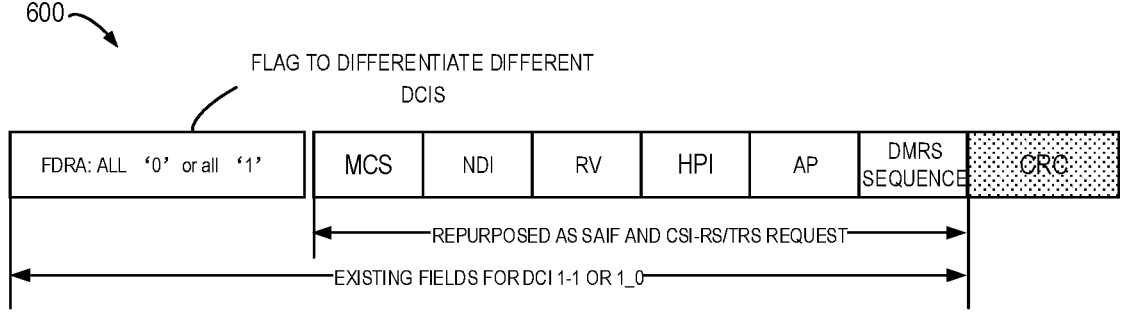
FIG. 6 illustrates an example of a new DCI Format without data scheduling to support a fast SCell activation/de-activation operation in accordance with some embodiments of the present disclosure.

FIG. 6 illustrates an example 600 of a new DCI format without data scheduling to support a fast SCell activation/de-activation operation in accordance with some embodiments of the present disclosure. As shown in the example 600 of FIG. 6, SCell activation can be triggered by using a DCI 1_1 or DCI 0_1 without scheduling PDSCH or PUSCH. In some designs, comparing with the examples 400 and 500, no additional fields are added in this new DCI of the example 600. To differentiate with the modified DCIs in the examples 400 and 500, the FDRA fields of the new DCI of the example 600 may be predefined to indicate that the DCI 1_1 or DCI 0_1 is used for SCell activation purpose. For example, all bits of the frequency domain resource assignment are set to 0 for resource allocation type 0, set to 1 for resource allocation type 1, or set to 0 or 1 for dynamic switch resource allocation type. As shown in the example 600, some fields or a subset of them in current DCI 1_1 or DCI 1_0 may be repurposed and used to indicate the field of SAIF and CSI request field(s) for fast SCell activation. These fields may include Modulation and coding scheme of transport block 1, New data indicator of transport block 1, Redundancy version of transport block 1, HARQ process number, Antenna port(s), DMRS sequence initialization, and other like field.

As a fifth option of the signaling message for transmitting the single triggering command as shown in FIG. 2A, the single triggering command may be carried in group downlink control information (DCI) for a group of terminal devices including the terminal device 120. In this way, the latency of the triggering of the SCell activation and aperiodic TRS/CSI-RS transmission can be further reduced compared to using a MAC CE message. Further, the signaling overhead for the triggering commands can be reduces compared to using a DCI specific to a terminal device.

In some embodiments, the group DCI may include multiple blocks for the group of terminal devices, respectively. Each of the multiple blocks may include an activation indicator field. The activation indicator field may include a set of bits for a set of secondary cells configured for the terminal device 120. Each of the set of bits can indicate an activation/deactivation state of corresponding one of the set of secondary cells. In this way, the control flexibility and granularity of the set of the secondary cells can be maximized. Alternatively, each of the set of bits can indicate an activation/deactivation state of a predetermined group of secondary cells among the set of secondary cells. As such, the signaling overhead for the added activation indicator field can be reduced.

Alternatively or additionally, each of the multiple blocks may include a TRS request field. The TRS request field may include the second triggering information 225 for triggering the transmission of the TRS 114. In this way, the triggering of the transmission of the TRS 114 can be indicated in the group DCI. Alternatively or additionally, each of the multiple blocks may include a CSI-RS request field. The CSI-RS request field can be used for indicating a transmission of an aperiodic CSI-RS and an associated CSI reporting. In this way, the triggering of the aperiodic CSI-RS and an associated CSI reporting can be indicated in the group DCI.

Figure 7:
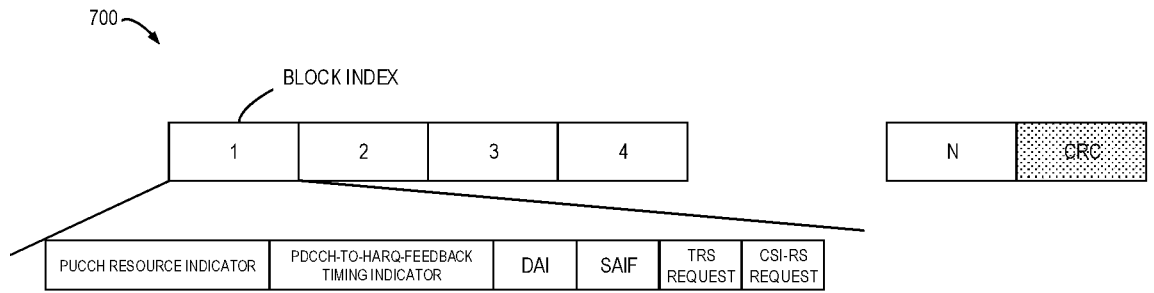
FIG. 7 illustrates an example of a new group-common DCI Format to support a fast SCell activation/de-activation operation in accordance with some embodiments of the present disclosure.

FIG. 7 illustrates an example 700 of a new group-common DCI format to support a fast SCell activation/de-activation operation in accordance with some embodiments of the present disclosure. As shown in the example 700 of FIG. 7, a new DCI format 2_X may be used for fast SCell activation and A-TRS and CSI-RS triggering for one or more UEs. For example, some information may be transmitted by means of the DCI format 2_X with CRC scrambled by a dedicated Radio Network Temporary Identifier (RNTI). The transmitted information may include block number 1, block number 2, . . . , and block number N. The starting position of a block can be determined by the parameter PositionDCI-2-X provided by higher layers for the UE configured with the block.

As shown in the example 700, some fields may be defined for one of the blocks. These fields may include a PUCCH resource indicator, which may be 3 bits. Another field may be a PDCCH-to-HARQ_feedback timing indicator, which may be 0, 1, 2, or 3 bits. A further field can be a downlink assignment index, which can include 2 bits if Type-2 HARQ-ACK codebook is configured. Otherwise, the downlink assignment index can include 0 bits. A still further field may be an SCell Activation Indicator field (SAIF), which can include bitmap with S bits, where S is determined according to number of SCells and each SAIF bit corresponds to one of the SCell. In some designs, in order to reduce the signaling overhead, the SCells may be divided into a set of SCell groups and each SAIF bit corresponds to one of the SCell group(s). Further, two CSI-RS request fields may be included to trigger TRS and CSI-RS for CSI reporting separately.

As discussed above with reference to FIG. 2B, even if the triggering mode for triggering the activation of the secondary cell 135 and the transmission of the TRS 114 is the first triggering mode, the pair of the first triggering information 225 and the second triggering information 235 can be transmitted via different triggering commands. In other words, a hybrid triggering mechanism may be introduced for SCell activation and TRS/CSI-RS triggering, thereby improving the transmission flexibility of the first triggering information 225 and the second triggering information 235.

In some embodiments, SCell activation may be triggered by MAC CE conveyed by PDSCH. In addition, the scheduling DCI of the PDSCH convening MAC CE may be used to trigger the corresponding TRS/CSI-RS. In these embodiments, referring back to FIG. 2B, in transmitting the first triggering information 225 and the second triggering information 235, the network device 110 may transmit the first triggering information 225 via a MAC CE. Further, the network device 110 can transmit the second triggering information 235 via a DCI scheduling a PDSCH conveying the MAC CE. Accordingly, on the side of the terminal device 120, in receiving the first triggering information 225 and the second triggering information 235, the terminal device 120 may receive the first triggering information 225 via the MAC CE. Also, the terminal device 120 may receive the second triggering information 235 via the DCI scheduling the PDSCH conveying the MAC CE.

In some other embodiments, two paired DL and UL grants may be transmitted in a same PDCCH monitoring occasion. In this event, the DL grant (for example, DCI Format 1_1) may be used for SCell activation purpose and the UL grant may be used for TRS/CSI-RS triggering. In these embodiments, referring back to FIG. 2B, in transmitting the first triggering information 225 and the second triggering information 235, the network device 110 may transmit the first triggering information 225 via one of a first DCI and a second DCI. The first DCI may be used for the scheduling of PDSCH in one cell and the second DCI may be used for scheduling of a PUSCH in one cell. Further, the network device 110 may transmit the second triggering information 235 via the other one of the first DCI and the second DCI. The first DCI and the second DCI may be paired and transmitted in a same physical downlink control channel (PDCCH) monitoring occasion. In this way, the transmission flexibility of the first triggering information 225 and the second triggering information 235 can be improved. Accordingly, on the side of the terminal device 120, in receiving the first triggering information 225 and the second triggering information 235, the terminal device 120 may receive the first triggering information 225 via one of the first DCI and the second DCI. In addition, the terminal device 120 may receive the second triggering information 235 via the other one of the first DCI and the second DCI.

In some embodiments, for all the transmission approaches for the triggering commands as discussed above, the aperiodic TRS triggered by the triggering command may serve as a quasi-co-located (QCL) source for the paired aperiodic CSI-RS as well as the PDCCH/PDSCH DMRS during SCell activation procedure. In these embodiments, if the second triggering information 225 indicates triggering of the transmission of the temporary reference signal 114, the terminal device 120 may use the temporary reference signal 114 as a QCL source for the CSI-RS 116 associated with the secondary cell 135. Similarly, the terminal device 120 may also use the temporary reference signal 114 as a QCL source for a PDCCH, a PDSCH, or a DMRS during the activation of the secondary cell 135. In this way, the activation procedure of the secondary cell 135 can be further optimized.

Figure 8:
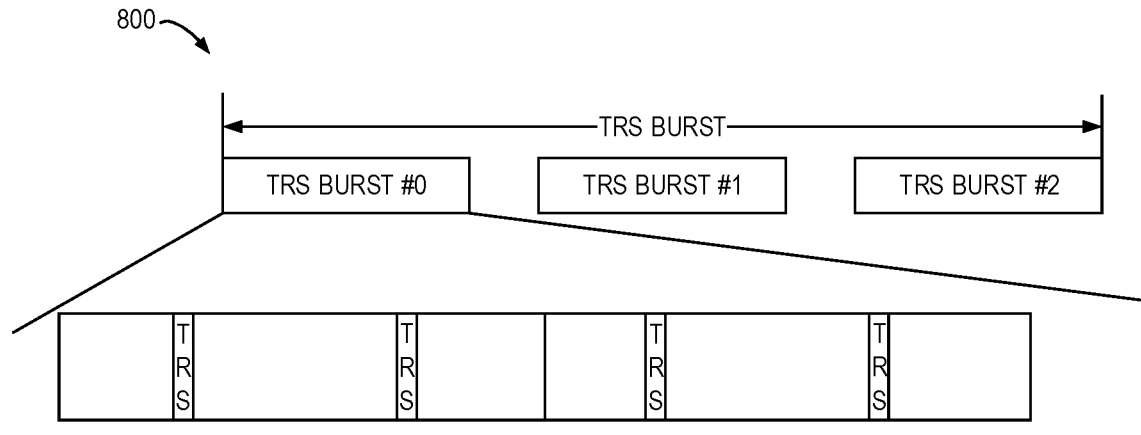
FIG. 8 illustrates an example of a burst-based configurable TRS structure to support a fast SCell activation/de-activation operation in accordance with some embodiments of the present disclosure.

FIG. 8 illustrates an example 800 of a burst-based configurable TRS structure to support a fast SCell activation/de-activation operation in accordance with some embodiments of the present disclosure. As shown in the example 800 of FIG. 8, the number of TRS transmission bursts may be configured on a per terminal device basis by dedicated RRC signaling. As such, the configuration flexibility and the functionality of the TRS can be enhanced. In some embodiments, each TRS burst may correspond to one or two slots of TRS as defined in Rel-15/16. For example, the one or two slots of TRS can be defined as 2-slot with four CSI-RSs resources (4 samples) for the frequency range 1 (FR1). As another example, the one or two slots of TRS may be defined as either "1-slot with two CSI-RSs resources (2 samples)" or "2-slot with four CSI-RSs resources (4 samples)" for the frequency range 2 (FR2).

In such embodiments, referring back to FIGS. 1A and 1B, the network device 110 may transmit a configuration message to the terminal device 120. The configuration message can be used for configuring the number of transmission bursts of the temporary reference signal 114. For example, the number can be determined and independently configured per terminal device. Accordingly, the terminal device 120 can receive the configuration message from the network device 110. Then, the terminal device 120 may determine the configured number of transmission bursts of the temporary reference signal 114.

In some embodiments, commonly for all alternatives using DCI Format for fast SCell activation and TRS/CSI-RS triggering, one field may be added to explicitly indicate the timing offset between the triggering command and the triggered TRS and CSI-RS pairs. In this way, the locations of the triggered TRS and CSI-RS pairs in the time domain can be efficiently indicated by means of the timing of the DCI. In some designs, a set of offset pairs may be provided by RRC signaling on a per UE basis, denoting as $\Delta_i$, i≥0. One of these offset pairs may be dynamically indicated by the triggering command.

Figure 9:
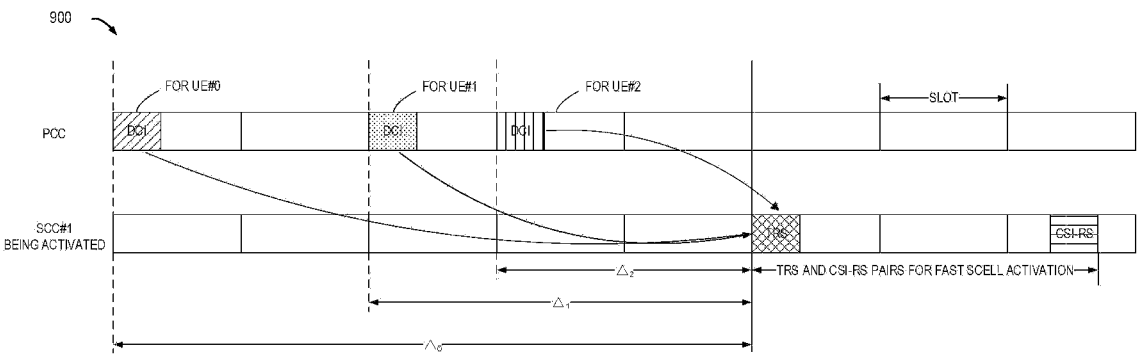
FIG. 9 illustrates an example of a dynamic offset indication to trigger paired TRS and CSI-RS in accordance with some embodiments of the present disclosure.

FIG. 9 illustrates an example 900 of a dynamic offset indication to trigger paired TRS and CSI-RS in accordance with some embodiments of the present disclosure. As shown in the example 900 of FIG. 9, there is provided one example of dynamic offset indication for <TRS, CSI-RS> pairs in fast SCell activation procedure to activate SCell #1 for three UEs in different time instances. Referring to FIG. 9, four pairs of $\Delta_i$, 0≤i≤3 may be configured for UE #0, UE #1 and UE #2 by means of dedicated RRC signaling. Depending on the time instance that SCell #1 activation happens, different $\Delta_i$ index may be indicated by different DCIs and may point to a common TRS/CSI-RS pairs for SCell #1 activation and therefore reduces RS overhead from system perspective compared to separate TRS/CSI-RS for different terminal devices.

Accordingly, in some embodiments, with reference to FIGS. 1A and 1B, the network device 110 may first determine the triggering of the activation of the secondary cell 135 and the transmission of the temporary reference signal 114. Then, the network device 110 may determine a transmitting timing of a DCI for carrying the single triggering command. Further, with the above-discussed dynamic offset indication to trigger paired TRS and CSI-RS, the network device 110 may selecting an offset pair from a set of offset pairs configured by radio resource control (RRC) signaling.

The offset pair may include a first timing offset and a second timing offset. The first timing offset may be between the DCI and the transmission of the temporary reference signal 114, and the second timing offset may be between the DCI and the transmission of the CSI-RS 116 associated with the secondary cell 135. Next, the network device 110 may determine a transmitting timing of the temporary reference signal 114 based on the transmitting timing of the DCI and the first timing offset. Similarly, the network device 110 may determine a transmitting timing of the CSI-RS based on the transmitting timing of the DCI and the second timing offset. Then, the network device 110 can generate the DCI to indicate the selected offset pair. Afterwards, the network device 110 may transmit the DCI to the terminal device 120.

Accordingly, with reference to FIGS. 1A and 1B, the terminal device 120 may receive the single triggering command from the network device 110 via the DCI. Further, from the single triggering command, the terminal device 120 can determine the triggering of the activation of the secondary cell 135 and the transmission of the temporary reference signal 114. In addition, the terminal device 120 may determine an indicated offset pair from the DCI. The indicated offset pair is from a set of offset pairs configured by radio resource control (RRC) signaling. As mentioned above, the indicated offset pair can include the first timing offset and the second timing offset. Then, the terminal device 120 can determine a receiving timing of the temporary reference signal 114 based on a receiving timing of the DCI and the first timing offset. Similarly, the terminal device 120 can determine a receiving timing of the CSI-RS 116 based on a receiving timing of the DCI and the second timing offset.

Some embodiments of the present disclosure may relate to timeline considerations. For example, a timing offset between the last symbol of the DL channel carrying triggering commands may be specified in unit of slots or symbols based on the smallest numerology or subcarrier spacing (SCS) between the triggering command and the triggered TRS. In this way, the locations of the triggered TRS and CSI-RS pairs in the time domain can be efficiently indicated by means of the timing of various possible physical channels. With this specified timing offset and in some embodiments, based on the single triggering command received from the network device 110, the terminal device 120 may determine the triggering of the activation of the secondary cell 135 and the transmission of the temporary reference signal 114. Further, since the timing offset is specified, the terminal device 120 may determine a timing offset from the single triggering command. The timing offset may be between a last symbol of a physical channel carrying the single triggering command and the transmission of the temporary reference signal 114.

In some embodiments, the physical channel carrying the triggering command may be a PDSCH (referred to as Approach-1 in the following) or a PDCCH (referred to as Approach-2 in the following). In some embodiments, the timing offset may have a first minimum value if the physical channel is the PDSCH and has a second minimum value if the physical channel is the PDCCH. In addition, the first minimum value may be greater than the second minimum value. More specifically, for Approach-1, any timing offset value may be required to fulfill the following requirement:

$$\Delta \geq 3 N_{slot}^{subframe,\mu}$$

so as to accommodate the MAC CE processing, RF warm-up and retuning time.

$$N_{slot}^{subframe,\mu}$$

may represent the number of slots in a subframe. For Approach-2, it may be further reduced due to lack of MAC CE processing operation and the exact value may be subject to UE capability report.

In some other embodiments, the timing offset may be defined relative to the PUCCH transmission with HARQ-ACK information for the activation command based on the smallest SCS between the PUCCH and the triggered TRS. As such, the timing offset needs to be indicated may be decreased, and thus reducing the singling overhead for indicating the timing offset. In these embodiments, with reference to FIGS. 1A, 1B and 2A, the network device 110 may determine the triggering of the activation of the secondary cell 135 and the transmission of the temporary reference signal 114. In addition, the network device 110 may generate the single triggering command to include a timing offset between a last symbol of a PUCCH for carrying a HARQ-ACK feedback for the triggering command and the transmission of a first symbol of the temporary reference signal 114. Accordingly, based on the single triggering command received from the network device 110, the terminal device 120 may determine the triggering of the activation of the secondary cell 135 and the transmission of the temporary reference signal 114. Further, from the single triggering command, the terminal device 120 may determine a timing offset. The timing offset may be between the last symbol of the PUCCH for carrying the HARQ-ACK feedback for the triggering command and the transmission of the first symbol of the temporary reference signal 114.

Figure 10:
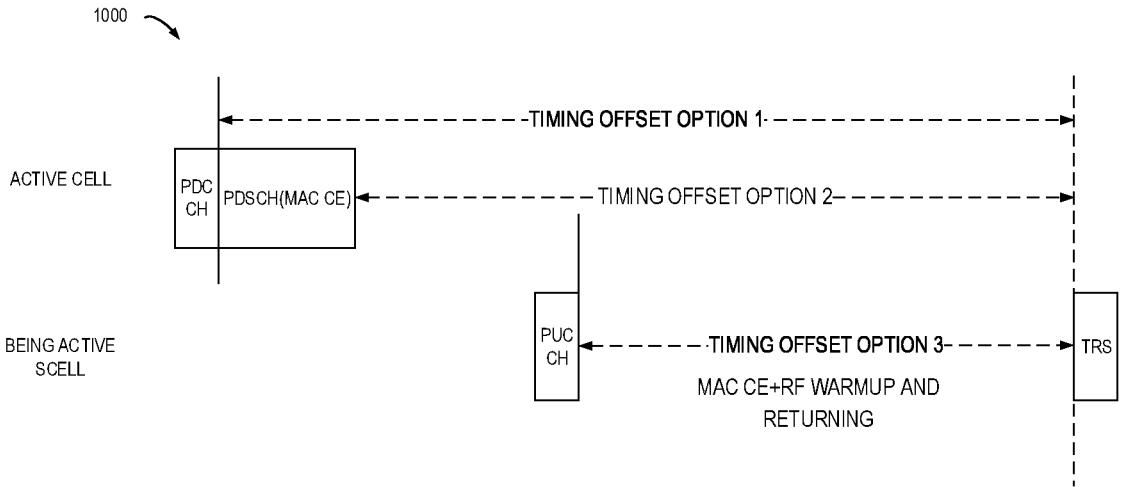
FIG. 10 illustrates an example of a timeline for aperiodic TRS transmission for fast SCell activation in accordance with some embodiments of the present disclosure.

FIG. 10 illustrates an example 1000 of a timeline for aperiodic TRS transmission for fast SCell activation in accordance with some embodiments of the present disclosure. As shown in the example 1000 of FIG. 10, a set of timing offsets may be defined for a given SCS in unit of symbols and hard-encoded in specification. One of these timing offset values may be selected and reported by the terminal device 120 as part of capability signaling of the terminal device 120. The timing offset for the TRS transmission may be further indicated in a triggering command as explained earlier. The terminal device 120 may not expect that the scheduling offset is smaller than the UE reported timing offset for aperiodic TRS.

More specifically, in some embodiments, the terminal device 120 may transmit a capability report of the terminal device 120 to the network device 110. The capability report may include a timing offset between a last symbol of a PDSCH (for example, timing offset option 2 in FIG. 10) carrying the triggering command and the transmission of the temporary reference signal 114. Alternatively or additionally, the capability report can include a timing offset between a last symbol of a PDCCH (for example, timing offset option 1 in FIG. 10) carrying the triggering command and the transmission of the temporary reference signal 114. Alternatively or additionally, the capability report may include a timing offset (for example, timing offset option 3 in FIG. 10) between a last symbol of a PUCCH carrying a feedback for the triggering command and the transmission of the temporary reference signal 114. Accordingly, the network device 110 may receive the capability report of the terminal device 120 from the terminal device 120. Then, based on the capability report of the terminal device 120, the network device 110 can configure one or more of the above discussed timing offsets, so as to ensure that the scheduling offset is smaller than the UE reported timing offset for aperiodic TRS.

FIG. 11 illustrates a flowchart of an example method 1100 performed by a terminal device for triggering a secondary cell in accordance with some embodiments of the present disclosure. The method 1100 can be implemented at the terminal device 120 as shown in FIGS. 1A and 1B. It is to be understood that the method 1100 may include additional blocks not shown and/or may omit some shown blocks, and the scope of the present disclosure is not limited in this regard.

At block 1110, the terminal device 120 receives configuration information for configuring a triggering mode from the network device 110. The triggering mode is used for triggering activation of a secondary cell of the terminal device and a transmission of a temporary reference signal in the secondary cell.

At block 1120, the terminal device 120 receives first triggering information based on the configured triggering mode. The first triggering information is about the activation of the secondary cell and second triggering information on the transmission of the temporary reference signal for performing the activation of the secondary cell.

In some embodiments, the terminal device 120 may determine that the configuration information indicates a first triggering mode in which triggering of the transmission of the temporary reference signal depends on triggering of the activation of the secondary cell.

In some embodiments, the terminal device 120 may receive the pair of the first triggering information and the second triggering information via a single triggering command or different triggering commands.

In some embodiments, the single triggering command further triggers a transmission of an aperiodic CSI-RS and an associated CSI reporting.

In some embodiments, the terminal device 120 may determine that the configuration information indicates a second triggering mode in which triggering of the activation of the secondary cell and triggering of the transmission of the temporary reference signal are independent of each other.

In some embodiments, the terminal device 120 may receive the first triggering information via a first triggering command; and receive the second triggering information via a second triggering command separate from the first triggering command.

In some embodiments, the terminal device 120 may receive, from the network device, third triggering information on a transmission of a CSI-RS in the secondary cell via a third triggering command.

In some embodiments, the configuration information is received via at least one of the following: a system information block (SIB) message, a radio resource control (RRC) message, or Downlink Control Information (DCI) on a Physical Downlink Control Channel (PDCCH).

In some embodiments, if the second triggering information indicates triggering of the transmission of the temporary reference signal, the terminal device 120 may perform a time-frequency tracking based on the temporary reference signal and perform a CSI measurement based on the temporary reference signal.

In some embodiments, if the second triggering information indicates triggering of paired transmissions including the transmission of the temporary reference signal in a first resource set and a transmission of a channel state information reference signal (CSI-RS) in a second resource set, the terminal device 120 may perform a time-frequency tracking based on the temporary reference signal and perform a channel state information (CSI) measurement based on the CSI-RS signal.

In some embodiments, the single triggering command is carried in a media access control (MAC) control element (CE).

In some embodiments, the MAC CE is identified by a MAC subhead with a dedicated logical channel identifier (LCID).

In some embodiments, the MAC CE comprises: a set of activation/deactivation fields for a set of secondary cells configured for the terminal device, respectively, each of the set of activation/deactivation fields indicating an activation/deactivation state of a corresponding one of the set of secondary cells, and at least one temporary reference signal (TRS) field associated with one or more secondary cells to be in an activated state among the set of secondary cells, the at least one TRS field indicating resource sets for transmitting respective temporary reference signals in the secondary cells to be in the activated state.

In some embodiments, the at least one TRS field comprises: one TRS field commonly applying to a plurality of secondary cells to be in the activated state.

In some embodiments, the at least one TRS field comprises: a plurality of TRS fields applying to a plurality of secondary cells to be in the activated state, respectively.

In some embodiments, each of the at least one TRS field comprises: a first part indicating a first resource set for transmitting a temporary reference signal; and a second part indicating a second resource set for transmitting a CSI-RS.

In some embodiments, the terminal device 120 is configured with a set of pairs of resource sets for each secondary cell, each pair of resource sets comprising a first resource set for transmitting a temporary reference signal and a second resource set for transmitting a CSI-RS. Each of the plurality of TRS fields indicates one of the set of pairs of resource sets for a corresponding one of the plurality of secondary cells to be in the activated state.

In some embodiments, if the terminal device 120 is configured with a single pair of resource sets for one of the plurality of secondary cells to be in the activated state, the plurality of TRS fields exclude a TRS field for the secondary cell associated with the single pair of resource sets.

In some embodiments, if one of the plurality of secondary cells to be in the activated state is already in the activated state when the terminal device receives the MAC CE, the plurality of TRS fields exclude a TRS field for the secondary cell already in the activated state.

In some embodiments, the single triggering command is carried in modified downlink control information (DCI) used for scheduling of a PUSCH in one cell.

In some embodiments, the modified DCI comprises at least one of the following: an added activation indicator field with a set of bits for a set of secondary cells configured for the terminal device, each of the set of bits indicating an activation/deactivation state of corresponding one of the plurality of secondary cells or a predetermined group of secondary cells among the set of secondary cells, an added TRS request field including the second triggering information, an added field for configuring a feedback to be transmitted by the terminal device for the modified DCI, or a repurposed CSI-RS request field for indicating a transmission of an aperiodic CSI-RS and an associated CSI reporting.

In some embodiments, the single triggering command is carried in modified downlink control information (DCI) used for scheduling of a PDSCH in one DL cell.

In some embodiments, the modified DCI comprises at least one of the following: an activation indicator field with a set of bits for a set of secondary cells configured for the terminal device, each of the set of bits indicating an activation/deactivation state of corresponding one of the set of secondary cells or a predetermined group of secondary cells among the set of secondary cells, an added temporary reference signal (TRS) request field including the second triggering information, an added channel state information reference signal (CSI-RS) request field for indicating a transmission of an aperiodic CSI-RS and an associated CSI reporting, or a repurposed field for configuring a feedback to be transmitted by the terminal device for the modified DCI instead of a transmission of a physical downlink shared channel (PDSCH) scheduled by the DCI.

In some embodiments, the activation indicator field comprises: an added activation indicator field with the set of bits, each of the set of bits indicating an activation/deactivation state of corresponding one of the set of secondary cells, or a repurposed activation indicator field with the set of bits, each of the set of bits indicating an activation/deactivation state of a predetermined group of secondary cells among the set of secondary cells, instead of indicating a dormancy state of the predetermined group of secondary cells.

In some embodiments, the modified DCI further comprises a bit for indicating whether the activation indicator field is repurposed for indicating the activation/deactivation state.

In some embodiments, the single triggering command is carried in downlink control information (DCI) being repurposed for carrying the single triggering command without scheduling a transmission or reception of a physical shared channel.

In some embodiments, a frequency domain resource allocation (FRDA) field of the DCI is repurposed to indicate that the DCI is used for carrying the single triggering command.

In some embodiments, the DCI comprises at least one of the following: an activation indicator field with a set of bits for a set of secondary cells configured for the terminal device, each of the set of bits indicating an activation/deactivation state of corresponding one of the set of secondary cells or a predetermined group of secondary cells among the set of secondary cells, a temporary reference signal (TRS) request field including the second triggering information, or a CSI-RS request field for indicating a transmission of an aperiodic CSI-RS and an associated CSI reporting.

In some embodiments, at least one of the following fields of the DCI are repurposed to indicate the activation indicator field, the TRS request field, or the CSI-RS request field: modulation and coding scheme of transport block 1, new data indicator of transport block 1, redundancy version of transport block 1, hybrid automatic repeat request (HARQ) process number, antenna ports, or demodulation reference signal (DMRS) sequence initialization.

In some embodiments, the DCI comprises a DCI used for scheduling of a PUSCH in one cell or a DCI used for scheduling of a PDSCH in one DL cell.

In some embodiments, the single triggering command is carried in group downlink control information (DCI) for a group of terminal devices including the terminal device.

In some embodiments, the group DCI comprises a plurality of blocks for the group of terminal devices, respectively, and each of the plurality of blocks comprises at least one of the following: an activation indicator field with a set of bits for a set of secondary cells configured for the terminal device, each of the set of bits indicating an activation/deactivation state of corresponding one of the set of secondary cells or a predetermined group of secondary cells among the set of secondary cells, a temporary reference signal (TRS) request field including the second triggering information, or a channel state information reference signal (CSI-RS) request field for indicating a transmission of an aperiodic CSI-RS and an associated CSI reporting.

In some embodiments, the terminal device 120 may receive the first triggering information via a MAC CE, and receive the second triggering information via DCI scheduling a physical downlink shared channel (PDSCH) conveying the MAC CE.

In some embodiments, the terminal device 120 may receive the first triggering information via one of a first DCI used for scheduling of a PDSCH in one cell and a second DCI used for scheduling of a PUSCH in one cell, and receive the second triggering information via the other one of the first DCI and the second DCI, the first DCI and the second DCI being received in a same physical downlink control channel (PDCCH) monitoring occasion.

In some embodiments, if the second triggering information indicates triggering of the transmission of the temporary reference signal, the terminal device 120 may use the temporary reference signal as a quasi-co-located (QCL) source for at least one of the following: a CSI-RS associated with the secondary cell, or a physical downlink control channel (PDCCH), a physical downlink shared channel (PDSCH), or a demodulation reference signal (DMRS) during the activation of the secondary cell.

In some embodiments, the terminal device 120 may receive, from the network device, a configuration message for configuring the number of transmission bursts of the temporary reference signal, the number being determined and independently configured per terminal device.

In some embodiments, the terminal device 120 may receive the single triggering command from the network device via downlink control information (DCI); determine, from the single triggering command, triggering of the activation of the secondary cell and the transmission of the temporary reference signal; determine, from the DCI, an indicated offset pair from a set of offset pairs configured by radio resource control (RRC) signaling, the indicated offset pair comprising a first timing offset and a second timing offset, the first timing offset being between the DCI and the transmission of the temporary reference signal, the second timing offset being between the DCI and a transmission of a CSI-RS associated with the secondary cell; determine a receiving timing of the temporary reference signal based on a receiving timing of the DCI and the first timing offset; and determine a receiving timing of the CSI-RS based on a receiving timing of the DCI and the second timing offset.

In some embodiments, the terminal device 120 may determine, from the single triggering command, triggering of the activation of the secondary cell and the transmission of the temporary reference signal; and determine, from the single triggering command, a timing offset between a last symbol of a physical channel carrying the single triggering command and the transmission of the temporary reference signal.

In some embodiments, the physical channel is a physical downlink shared channel (PDSCH) or a physical downlink control channel (PDCCH).

In some embodiments, the timing offset has a first minimum value if the physical channel is the PDSCH and has a second minimum value if the physical channel is the PDCCH, and the first minimum value is greater than the second minimum value.

In some embodiments, the terminal device 120 may determine, from the single triggering command, triggering of the activation of the secondary cell and the transmission of the temporary reference signal; and determine, from the single triggering command, a timing offset between a last symbol of a Physical Uplink Control Channel (PUCCH) for carrying a hybrid automatic repeat request acknowledgement (HARQ-ACK) feedback for the triggering command and the transmission of a first symbol of the temporary reference signal.

In some embodiments, the terminal device 120 may transmit a capability report of the terminal device to the network device, the capability report comprising at least one of the following: a timing offset between a last symbol of a physical downlink shared channel (PDSCH) carrying the triggering command and the transmission of the temporary reference signal, a timing offset between a last symbol of a physical downlink control channel (PDCCH) carrying the triggering command and the transmission of the temporary reference signal, or a timing offset between a last symbol of a physical uplink control channel (PUCCH) carrying a feedback for the triggering command and the transmission of the temporary reference signal.

FIG. 12 illustrates a flowchart of another example method 1200 performed by a network device for triggering a secondary cell in accordance with some embodiments of the present disclosure. The method 1200 can be implemented at the network device 110 as shown in FIGS. 1A and 1B. It is to be understood that the method 1200 may include additional blocks not shown and/or may omit some shown blocks, and the scope of the present disclosure is not limited in this regard.

At block 1210, the network device 110 transmits, to the terminal device 120, configuration information for configuring a triggering mode for triggering activation of a secondary cell of the terminal device 120 and a transmission of a temporary reference signal in the secondary cell.

At block 1220, the network device 110 determines, based on the configured triggering mode, first triggering information on the activation of the secondary cell and second triggering information on the transmission of the temporary reference signal.

At block 1230, the network device 110 transmits, based on the configured triggering mode, the first triggering information and the second triggering information to the terminal device 120.

In some embodiments, the configuration information indicates a first triggering mode in which triggering of the transmission of the temporary reference signal depends on triggering of the activation of the secondary cell.

In some embodiments, the network device 110 transmits the pair of the first triggering information and the second triggering information via a single triggering command or different triggering commands.

In some embodiments, the single triggering command further triggers a transmission of an aperiodic channel state information reference signal (CSI-RS) and an associated CSI reporting.

In some embodiments, the configuration information indicates a second triggering mode in which triggering of the activation of the secondary cell and triggering of the transmission of the temporary reference signal are independent of each other.

In some embodiments, the network device 110 transmits the first triggering information via a first triggering command, and transmits the second triggering information via a second triggering command separate from the first triggering command.

In some embodiments, the network device 110 transmits, to the terminal device 120, third triggering information on a transmission of a channel state information reference signal (CSI-RS) in the secondary cell via a third triggering command.

In some embodiments, the configuration information is transmitted via at least one of the following: a system information block (SIB) message, a radio resource control (RRC) message, or Downlink Control Information (DCI) on a Physical Downlink Control Channel (PDCCH).

In some embodiments, the single triggering command is carried in a media access control (MAC) control element (CE).

In some embodiments, the MAC CE is identified by a MAC subhead with a dedicated logical channel identifier (LCID).

In some embodiments, the MAC CE comprises: a set of activation/deactivation fields for a set of secondary cells configured for the terminal device, respectively, each of the set of activation/deactivation fields indicating an activation/deactivation state of a corresponding one of the set of secondary cells, and at least one temporary reference signal (TRS) field associated with one or more secondary cells to be in an activated state among the set of secondary cells, the at least one TRS field indicating resource sets for transmitting respective temporary reference signals in the secondary cells to be in the activated state.

In some embodiments, the at least one TRS field comprises: one TRS field commonly applying to a plurality of secondary cells to be in the activated state.

In some embodiments, the at least one TRS field comprises: a plurality of TRS fields applying to a plurality of secondary cells to be in the activated state, respectively.

In some embodiments, each of the at least one TRS field comprises: a first part indicating a first resource set for transmitting a temporary reference signal; and a second part indicating a second resource set for transmitting a channel state information reference signal (CSI-RS).

In some embodiments, the terminal device 120 is configured with a set of pairs of resource sets for each secondary cell, each pair of resource sets comprising a first resource set for transmitting a temporary reference signal and a second resource set for transmitting a channel state information reference signal (CSI-RS). Each of the plurality of TRS fields indicates one of the set of pairs of resource sets for a corresponding one of the plurality of secondary cells to be in the activated state.

In some embodiments, if the terminal device is configured with a single pair of resource sets for one of the plurality of secondary cells to be in the activated state, the plurality of TRS fields exclude a TRS field for the secondary cell associated with the single pair of resource sets.

In some embodiments, if one of the plurality of secondary cells to be in the activated state is already in the activated state when the terminal device receives the MAC CE, the plurality of TRS fields exclude a TRS field for the secondary cell already in the activated state.

In some embodiments, the single triggering command is carried in modified downlink control information (DCI) used for scheduling of a PUSCH in one cell.

In some embodiments, the modified DCI comprises at least one of the following: an added activation indicator field with a set of bits for a set of secondary cells configured for the terminal device, each of the set of bits indicating an activation/deactivation state of corresponding one of the set of secondary cells or a predetermined group of secondary cells among the plurality of secondary cells, an added TRS request field including the second triggering information, an added field for configuring a feedback to be transmitted by the terminal device for the modified DCI, or a repurposed channel state information reference signal (CSI-RS) request field for indicating a transmission of an aperiodic CSI-RS and an associated CSI reporting.

In some embodiments, the single triggering command is carried in modified downlink control information (DCI) used for scheduling of a PDSCH in one DL cell.

In some embodiments, the modified DCI comprises at least one of the following: an activation indicator field with a set of bits for a set of secondary cells configured for the terminal device, each of the set of bits indicating an activation/deactivation state of corresponding one of the set of secondary cells or a predetermined group of secondary cells among the set of secondary cells, an added temporary reference signal (TRS) request field including the second triggering information, an added channel state information reference signal (CSI-RS) request field for indicating a transmission of an aperiodic CSI-RS and an associated CSI reporting, or a repurposed field for configuring a feedback to be transmitted by the terminal device for the modified DCI instead of a transmission of a physical downlink shared channel (PDSCH) scheduled by the DCI.

In some embodiments, the activation indicator field comprises: an added activation indicator field with the set of bits, each of the set of bits indicating an activation/deactivation state of corresponding one of the set of secondary cells, or a repurposed activation indicator field with the set of bits, each of the set of bits indicating an activation/deactivation state of a predetermined group of secondary cells among the set of secondary cells, instead of indicating a dormancy state of the predetermined group of secondary cells.

In some embodiments, the modified DCI further comprises a bit for indicating whether the activation indicator field is repurposed for indicating the activation/deactivation state.

In some embodiments, the single triggering command is carried in downlink control information (DCI) being repurposed for carrying the single triggering command without scheduling a transmission or reception of a physical shared channel.

In some embodiments, a frequency domain resource allocation (FRDA) field of the DCI is repurposed to indicate that the DCI is used for carrying the single triggering command.

In some embodiments, the DCI comprises at least one of the following:

an activation indicator field with a set of bits for a set of secondary cells configured for the terminal device, each of the set of bits indicating an activation/deactivation state of corresponding one of the set of secondary cells or a predetermined group of secondary cells among the set of secondary cells, a temporary reference signal (TRS) request field including the second triggering information, or a channel state information reference signal (CSI-RS) request field for indicating a transmission of an aperiodic CSI-RS and an associated CSI reporting.

In some embodiments, at least one of the following fields of the DCI are repurposed to indicate the activation indicator field, the TRS request field, or the CSI-RS request field: modulation and coding scheme of transport block 1, new data indicator of transport block 1, redundancy version of transport block 1, hybrid automatic repeat request (HARQ) process number, antenna ports, or demodulation reference signal (DMRS) sequence initialization.

In some embodiments, the DCI comprises a DCI used for scheduling of a PUSCH in one cell or a DCI used for scheduling of a PDSCH in one DL cell.

In some embodiments, the single triggering command is carried in group downlink control information (DCI) for a group of terminal devices including the terminal device.

In some embodiments, the group DCI comprises a plurality of blocks for the group of terminal devices, respectively, and each of the plurality of blocks comprises at least one of the following: an activation indicator field with a set of bits for a set of secondary cells configured for the terminal device, each of the set of bits indicating an activation/deactivation state of corresponding one of the set of secondary cells or a predetermined group of secondary cells among the set of secondary cells, a temporary reference signal (TRS) request field including the second triggering information, or a channel state information reference signal (CSI-RS) request field for indicating a transmission of an aperiodic CSI-RS and an associated CSI reporting.

In some embodiments, the network device 110 may transmit the first triggering information via a MAC CE and transmit the second triggering information via downlink control information (DCI) scheduling a physical downlink shared channel (PDSCH) conveying the MAC CE.

In some embodiments, the network device 110 may transmit the first triggering information via one of a first DCI used for the scheduling of PDSCH in one cell and a second DCI used for scheduling of a PUSCH in one cell; and transmit the second triggering information via the other one of the first DCI and the second DCI, the first DCI and the second DCI being transmitted in a same physical downlink control channel (PDCCH) monitoring occasion.

In some embodiments, the network device 110 may transmit, to the terminal device 120, a configuration message for configuring the number of transmission bursts of the temporary reference signal, the number being determined and independently configured per terminal device.

In some embodiments, the network device 110 may determine triggering of the activation of the secondary cell and the transmission of the temporary reference signal; determine a transmitting timing of downlink control information (DCI) for carrying the single triggering command; select an offset pair from a set of offset pairs configured by radio resource control (RRC) signaling, the offset pair comprising a first timing offset and a second timing offset, the first timing offset being between the DCI and the transmission of the temporary reference signal, the second timing offset being between the DCI and a transmission of a channel state information reference signal (CSI-RS) associated with the secondary cell; determine a transmitting timing of the temporary reference signal based on the transmitting timing of the DCI and the first timing offset; and determine a transmitting timing of the CSI-RS based on the transmitting timing of the DCI and the second timing offset; generate the DCI to indicate the offset pair; and transmit the DCI to the terminal device.

In some embodiments, the network device 110 may determine the triggering of the activation of the secondary cell and the transmission of the temporary reference signal; and generate the single triggering command to include a timing offset between a last symbol of a physical channel carrying the single triggering command and the transmission of the temporary reference signal.

In some embodiments, the physical channel is a physical downlink shared channel (PDSCH) or a physical downlink control channel (PDCCH).

In some embodiments, the timing offset has a first minimum value if the physical channel is the PDSCH and has a second minimum value if the physical channel is the PDCCH, and the first minimum value is greater than the second minimum value.

In some embodiments, the network device 110 may determine the triggering of the activation of the secondary cell and the transmission of the temporary reference signal; and generate the single triggering command to include a timing offset between a last symbol of a Physical Uplink Control Channel (PUCCH) for carrying a hybrid automatic repeat request acknowledgement (HARQ-ACK) feedback for the triggering command and the transmission of a first symbol of the temporary reference signal.

In some embodiments, the network device 110 may receive a capability report of the terminal device from the terminal device, the capability report comprising at least one of the following: a timing offset between a last symbol of a physical downlink shared channel (PDSCH) carrying the triggering command and the transmission of the temporary reference signal, a timing offset between a last symbol of a physical downlink control channel (PDCCH) carrying the triggering command and the transmission of the temporary reference signal, or a timing offset between a last symbol of a physical uplink control channel (PUCCH) carrying a feedback for the triggering command and the transmission of the temporary reference signal.

In some embodiments, an apparatus capable of performing the method 1100 may comprise means for receiving, by a terminal device from a network device, configuration information for configuring a triggering mode for triggering activation of a secondary cell of the terminal device and a transmission of a temporary reference signal in the secondary cell; and means for receiving, by the terminal device based on the configured triggering mode, first triggering information on the activation of the secondary cell and second triggering information on the transmission of the temporary reference signal for performing the activation of the secondary cell.

In some embodiments, the apparatus further comprises means for performing other steps in some embodiments of the method 1100. In some embodiments, the means comprises at least one processor; and at least one memory including computer program code, the at least one memory and computer program code configured to, with the at least one processor, cause the performance of the apparatus.

In some embodiments, an apparatus capable of performing the method 1200 may comprise means for transmitting, to a terminal device, configuration information for configuring a triggering mode for triggering activation of a secondary cell of the terminal device and a transmission of a temporary reference signal in the secondary cell; means for determining, based on the configured triggering mode, first triggering information on the activation of the secondary cell and second triggering information on the transmission of the temporary reference signal; and means for transmitting, based on the configured triggering mode, the first triggering information and the second triggering information to the terminal device.

In some embodiments, the apparatus further comprises means for performing other steps in some embodiments of the method 1200. In some embodiments, the means comprises at least one processor; and at least one memory including computer program code, the at least one memory and computer program code configured to, with the at least one processor, cause the performance of the apparatus.

Figure 13:
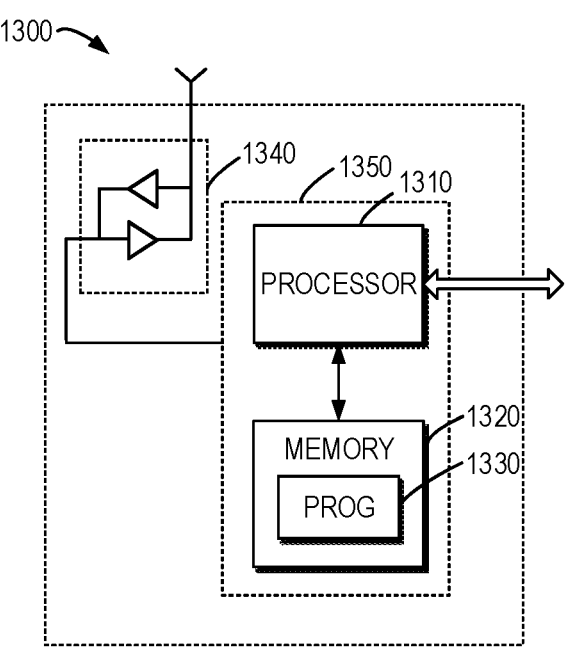
FIG. 13 illustrates a simplified block diagram of a device that is suitable for implementing some embodiments of the present disclosure.

FIG. 13 is a simplified block diagram of a device 1300 that is suitable for implementing embodiments of the present disclosure. For example, the terminal device 120 and the network device 110 can be implemented by the device 1300. As shown, the device 1300 includes one or more processors 1310, one or more memories 1320 coupled to the processor 1310, and one or more communication modules 1340 coupled to the processor 1310.

The communication module 1340 is for bidirectional communications. The communication module 1340 has at least one antenna to facilitate communication. The communication interface may represent any interface that is necessary for communication with other network elements.

The processor 1310 may be of any type suitable to the local technical network and may include one or more of the following: general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The memory 1320 may include one or more non-volatile memories and one or more volatile memories. Examples of the non-volatile memories include, but are not limited to, a Read Only Memory (ROM) 1324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1322 and other volatile memories that will not last in the power-down duration.

A computer program 1330 includes computer executable instructions that are executed by the associated processor 1310. The program 1330 may be stored in the ROM 1324. The processor 1310 may perform any suitable actions and processing by loading the program 1330 into the RAM 1322.

The embodiments of the present disclosure may be implemented by means of the program 1330 so that the device 1300 may perform any process of the disclosure as discussed with reference to the FIGS. 2A, 2B, 11 and 12. The embodiments of the present disclosure may also be implemented by hardware or by a combination of software and hardware.

In some embodiments, the program 1330 may be tangibly contained in a computer readable medium which may be included in the device 1300 (such as in the memory 1320) or other storage devices that are accessible by the device 1300. The device 1300 may load the program 1330 from the computer readable medium to the RAM 1322 for execution. The computer readable medium may include any types of tangible non-volatile storage, such as ROM, EPROM, a flash memory, a hard disk, CD, DVD, and the like.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (for example, server, host or node) operationally coupled to distributed unit, DU, (for example, a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 1300 may be comprised in a central unit (for example, a control unit, an edge cloud server, and a server) operatively coupled (for example, via a wireless or wired network) to a distributed unit (for example, a remote radio head/node). That is, the central unit (for example, an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 1300 may be instead comprised in the distributed unit, and at least some of the described processes may be performed by the distributed unit.

In an embodiment, the execution of at least some of the functionalities of the apparatus 1300 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 1300 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 1100 and/or 1200 as described above with reference to FIGS. 11 and 12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A terminal device comprising a processor coupled to memory, the processor configured to perform operations comprising:

receiving, from a network device, configuration information for configuring a triggering mode for triggering activation of a secondary cell of the terminal device and a transmission of a temporary reference signal in the secondary cell;

receiving, based on at least the configured triggering mode, first triggering information on the activation of the secondary cell and second triggering information on the transmission of the temporary reference signal for performing the activation of the secondary cell;

determining that the configuration information indicates a first triggering mode in which triggering of the transmission of the temporary reference signal depends on triggering of the activation of the secondary cell;

receiving a pair of the first triggering information and the second triggering information via a single triggering command, wherein the single triggering command or different triggering commands is carried in a media access control (MAC) control element (CE);

determining, from the single triggering command received via the MAC CE, triggering of the activation of the secondary cell and the transmission of the temporary reference signal;

determining an indicated offset pair from a set of offset pairs configured by radio resource control (RRC) signaling, the indicated offset pair comprising a first timing offset and a second timing offset, the first timing offset being between the MAC CE and the transmission of the temporary reference signal, the second timing offset being between the MAC CE and a transmission of a channel state information reference signal (CSI-RS) associated with the secondary cell;

determining a receiving timing of the temporary reference signal based on a receiving timing of the MAC CE and the first timing offset; and determining a receiving timing of the CSI-RS based on a receiving timing of the MAC CE and the second timing offset.

2. The processor terminal device of claim 1, the operations further comprising:

determining, from the single triggering command, triggering of the activation of the secondary cell and the transmission of the temporary reference signal; and determining, from the single triggering command, a timing offset between a last symbol of a physical channel carrying the single triggering command or different triggering commands and the transmission of the temporary reference signal.

3. The terminal device of claim 2, wherein the physical channel is a physical downlink shared channel (PDSCH) or a physical downlink control channel (PDCCH) and wherein, the timing offset has a first minimum value if the physical channel is the PDSCH and has a second minimum value if the physical channel is the PDCCH, and the first minimum value is greater than the second minimum value.

4. The terminal device of claim 1, the operations further comprising:

determining, from the single triggering command, triggering of the activation of the secondary cell and the transmission of the temporary reference signal; and determining, from the single triggering command, a timing offset between a last symbol of a Physical Uplink Control Channel (PUCCH) for carrying a hybrid automatic repeat request acknowledgement (HARQ-ACK) feedback for the triggering command or different triggering commands and the transmission of a first symbol of the temporary reference signal.

5. The terminal device of claim 1, further comprising:

transmitting a capability report of the terminal device to the network device, the capability report comprising at least one of the following:

a timing offset between a last symbol of a physical downlink shared channel (PDSCH) carrying the triggering command and the transmission of the temporary reference signal, a timing offset between a last symbol of a physical downlink control channel (PDCCH) carrying the triggering command and the transmission of the temporary reference signal, or a timing offset between a last symbol of a physical uplink control channel (PUCCH) carrying a feedback for the triggering command and the transmission of the temporary reference signal.

6. A network device comprising a processor coupled to memory, the processor configured to perform operations comprising:

transmitting, to a terminal device, configuration information for configuring a triggering mode for triggering activation of a secondary cell of the terminal device and a transmission of a temporary reference signal in the secondary cell, wherein the configuration information indicates a first triggering mode in which triggering of the transmission of the temporary reference signal depends on triggering of the activation of the secondary cell;

determining, based on at least the configured triggering mode, first triggering information on the activation of the secondary cell and second triggering information on the transmission of the temporary reference signal;

transmitting, based on at least the configured triggering mode, the first triggering information and the second triggering information to the terminal device transmitting a pair of the first triggering information and the second triggering information via a single triggering command, wherein the single triggering command is carried in a media access control (MAC) control element (CE);

determining triggering of the activation of the secondary cell and the transmission of the temporary reference signal;

determining a transmitting timing of the MAC CE for carrying the single triggering command;

selecting an offset pair from a set of offset pairs configured by radio resource control RRC) signaling, the offset pair comprising a first timing offset and a second timing offset, the first timing offset being between the MAC CE and the transmission of the temporary reference signal, the second timing offset being between the MAC CE and a transmission of a channel state information reference signal (CSI-RS) associated with the secondary cell;

determining a transmitting timing of the temporary reference signal based on the transmitting timing of the MAC CE and the first timing offset; and determining a transmitting timing of the CSI-RS based on the transmitting timing of the MAC CE and the second timing offset;

generating the MAC CE to indicate the offset pair; and transmitting the MAC CE to the terminal device.

7. The network device of claim 6, the operations further comprising:

determining the triggering of the activation of the secondary cell and the transmission of the temporary reference signal; and generating the single triggering command to include a timing offset between a last symbol of a physical channel carrying the single triggering command or different triggering commands and the transmission of the temporary reference signal.

8. The network device of claim 7, wherein the physical channel is a physical downlink shared channel (PDSCH) or a physical downlink control channel (PDCCH), and wherein, the timing offset has a first minimum value if the physical channel is the PDSCH and has a second minimum value if the physical channel is the PDCCH, and the first minimum value is greater than the second minimum value.

9. The network device of claim 6, the operations further comprising:

determining the triggering of the activation of the secondary cell and the transmission of the temporary reference signal; and generating the single triggering command to include a timing offset between a last symbol of a Physical Uplink Control Channel (PUCCH) for carrying a hybrid automatic repeat request acknowledgement (HARQ-ACK) feedback for the triggering command and the transmission of a first symbol of the temporary reference signal.

10. The network device of claim 6, the operations further comprising:

receiving a capability report of the terminal device from the terminal device, the capability report comprising at least one of the following:

a timing offset between a last symbol of a physical downlink shared channel (PDSCH) carrying the triggering command and the transmission of the temporary reference signal, a timing offset between a last symbol of a physical downlink control channel (PDCCH) carrying the triggering command and the transmission of the temporary reference signal, or a timing offset between a last symbol of a physical uplink control channel (PUCCH) carrying a feedback for the triggering command and the transmission of the temporary reference signal.

11. A terminal device comprising:

at least one processor; and at least one memory including computer program codes;

the at least one memory and the computer program codes being configured to, with the at least one processor, cause the terminal device to:

receive, from a network device, configuration information for configuring a triggering mode for triggering activation of a secondary cell of the terminal device and a transmission of a temporary reference signal in the secondary cell;

receive, based on at least the configured triggering mode, first triggering information on the activation of the secondary cell and second triggering information on the transmission of the temporary reference signal for performing the activation of the secondary cell, wherein the first triggering information and the second triggering information is received via a single triggering command or different triggering commands, wherein the single triggering command or different triggering commands is carried in a media access control (MAC) control element (CE);

determine that the configuration information indicates a first triggering mode in which triggering of the transmission of the temporary reference signal depends on triggering of the activation of the secondary cell;

determine triggering of the activation of the secondary cell and the transmission of the temporary reference signal;

determine an indicated offset pair from a set of offset pairs configured by radio resource control (RRC) signaling, the indicated offset pair comprising a first timing offset and a second timing offset, the first timing offset being between the MAC CE the transmission of the temporary reference signal, the second timing offset being between the MAC CE and a transmission of a channel state information reference signal (CSI-RS) associated with the secondary cell;

determine a receiving timing of the temporary reference signal based on a receiving timing of the MAC CE and the first timing offset; and determine a receiving timing of the CSI-RS based on a receiving timing of the MAC CE and the second timing offset.

\* \* \* \* \*